(12) United States Patent
Yumiki

(10) Patent No.: US 8,854,480 B2
(45) Date of Patent: Oct. 7, 2014

(54) DISPLAY CONTROL DEVICE, IMAGING DEVICE, AND PRINTING DEVICE

(71) Applicant: Panasonic Corporation, Osaka (JP)

(72) Inventor: Naoto Yumiki, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 13/684,913

(22) Filed: Nov. 26, 2012

(65) Prior Publication Data

US 2013/0077108 A1 Mar. 28, 2013

Related U.S. Application Data

(63) Continuation of application No. 12/173,599, filed on Jul. 15, 2008, now Pat. No. 8,345,107.

(30) Foreign Application Priority Data

Jul. 19, 2007 (JP) .................................. 2007-187765

(51) Int. Cl.
| | |
|---|---|
| *H04N 5/225* | (2006.01) |
| *H04N 5/222* | (2006.01) |
| *G03B 17/00* | (2006.01) |
| *H04N 5/232* | (2006.01) |
| *G06K 15/02* | (2006.01) |
| *H04N 1/00* | (2006.01) |
| *H04N 5/77* | (2006.01) |
| *H04N 1/21* | (2006.01) |
| *G09G 5/32* | (2006.01) |
| *H04N 1/32* | (2006.01) |
| *H04N 101/00* | (2006.01) |
| *H04N 9/82* | (2006.01) |
| *H04N 5/765* | (2006.01) |

(52) U.S. Cl.
CPC .............. *G09G 5/32* (2013.01); *H04N 5/23261* (2013.01); *H04N 2201/3247* (2013.01); *G06K 15/02* (2013.01); *H04N 1/32101* (2013.01); *H04N 2101/00* (2013.01); *H04N 1/0045* (2013.01); *H04N 9/8205* (2013.01); *H04N 2201/3277* (2013.01); *H04N 1/00448* (2013.01); *H04N 1/00442* (2013.01); *H04N 1/00461* (2013.01); *H04N 5/23258* (2013.01); *H04N 1/00453* (2013.01); *H04N 2201/3252* (2013.01); *H04N 5/772* (2013.01); *H04N 5/23287* (2013.01); *H04N 5/23293* (2013.01); *H04N 5/765* (2013.01); *H04N 1/2112* (2013.01)
USPC ...................... 348/207.2; 348/333.05; 396/52

(58) Field of Classification Search
USPC ......... 348/207.1, 208.1–208.11, 294, 333.05, 348/371; 345/619; 396/52, 55
See application file for complete search history.

(56) References Cited

U.S. PATENT DOCUMENTS

| | | | |
|---|---|---|---|
| 6,567,667 | B1 | 5/2003 | Gupta et al. |
| 6,657,667 | B1 | 12/2003 | Anderson |

(Continued)

FOREIGN PATENT DOCUMENTS

| | | | |
|---|---|---|---|
| JP | H6-303562 | A | 10/1994 |
| JP | H6-326965 | A | 11/1994 |

(Continued)

*Primary Examiner* — Trung Diep
(74) *Attorney, Agent, or Firm* — Pearne & Gordon LLP

(57) ABSTRACT

A digital camera 1 has an image recorder 12, a microprocessor 3, and an image display controller 13. The image recorder 12 records a plurality of sequentially captured images along with a panning mode signal 60 related to the panning operation of the digital camera 1. The microprocessor 3 determines the layout of the plurality of images on the basis of the panning mode signal 60 recorded to the image recorder 12. The image display controller 13 displays a plurality of images side by side on a liquid crystal monitor 55 on the basis of the determination result of the microprocessor 3.

12 Claims, 31 Drawing Sheets

(56) References Cited

U.S. PATENT DOCUMENTS

| | | |
|---|---|---|
| 6,857,667 B2 * | 2/2005 | Malone .................. 285/307 |
| 7,324,134 B2 * | 1/2008 | Sato et al. .................. 348/208.2 |
| 7,386,188 B2 | 6/2008 | Peterson |
| 7,728,885 B2 * | 6/2010 | van Schalkwyk .......... 348/231.2 |
| 7,911,511 B2 | 3/2011 | Yoshikawa et al. |
| 2001/0046309 A1 | 11/2001 | Kamei |
| 2003/0035047 A1 | 2/2003 | Katayama et al. |
| 2003/0043276 A1 * | 3/2003 | Tojo .................. 348/207.99 |
| 2007/0092009 A1 | 4/2007 | Muraki |
| 2007/0268394 A1 * | 11/2007 | Nonaka et al. ........... 348/333.12 |
| 2009/0102931 A1 | 4/2009 | Yoshikawa et al. |
| 2011/0134301 A1 | 6/2011 | Yoshikawa et al. |

FOREIGN PATENT DOCUMENTS

| | | |
|---|---|---|
| JP | 08-163485 A | 6/1996 |
| JP | 2000-32301 A | 1/2000 |
| JP | 2001-36792 A | 2/2001 |
| JP | 2001-45354 A | 2/2001 |
| JP | 2001-86451 A | 3/2001 |
| JP | 2001-111919 A | 4/2001 |
| JP | 2001-230959 A | 8/2001 |
| JP | 2007-122275 A | 5/2007 |
| WO | 20061126309 A1 | 11/2006 |

* cited by examiner

DISPLAY CONTROL DEVICE, IMAGING DEVICE, AND PRINTING DEVICE

CROSS-REFERENCE TO RELATED APPLICATIONS

This application claims priority to Japanese Patent Application No. 2007-187765 filed on Jul. 19, 2007. The entire disclosure of Japanese Patent Application No. 2007-187765 is hereby incorporated herein by reference. Also, this application is a continuation of U.S. patent application Ser. No. 12/173,599 filed Jul. 15, 2008, which is incorporated herein by reference in its entirety.

BACKGROUND OF THE INVENTION

1. Field of the Invention

The present invention relates to a display control device, and more particularly to a display control device with which a plurality of images can be displayed side by side.

2. Background Information

The integration of signal processing and imaging sensors has been on the rise in recent years in CCDs (Charge Coupled Devices), CMOSs (Complementary Metal-Oxide Semiconductors), and so forth, and these products can now be provided inexpensively. Because of this, there has been a surge in the popularity of digital cameras and digital video cameras (hereinafter referred to simply as digital cameras) with which an optical image of a subject can be converted into an electrical image signal and outputted.

With most digital cameras, a compact display device is installed, and has the function of displaying images one at a time, or the function of displaying a plurality of images all at once (hereinafter referred to as a thumbnail display). As shown in Japanese Laid-Open Patent Application 2001-45354, displaying images according to the posture of the digital camera during photography, for example, has been proposed as a more convenient display method.

Also, as shown in Japanese Laid-Open Patent Application H6-303562, an imaging device has been proposed with which the progress of the photography can be checked in a device that produces a single panorama image by piecing together a plurality of images.

When a moving subject, such as a car or an airplane, is photographed, the user takes the picture while moving the digital camera horizontally, vertically, or at an angle. Changing the direction of the camera in this way is called panning. When a plurality of images that have been sequentially captured by panning (hereinafter referred to as panned images) are displayed as thumbnail views, in the past they were displayed side by side in the order of the date and time when they were captured.

With a conventional thumbnail display, however, because the direction in which the panned images are aligned does not necessarily coincide with the direction in which the display component is moving or the direction in which the subject is moving during photography, the user may feel some discomfort when viewing the images.

This is not limited to imaging devices, and the same applies when images are printed by printing devices.

SUMMARY OF THE INVENTION

It is an object of the present invention to provide a display control device, an imaging device, and a printing device with which a plurality of images can be displayed side by side in a way that is easier for the user to view.

The display control device according to a first aspect of the present invention is a device for controlling a display component to display a plurality of images side by side. This display control device includes a recorder, a layout determiner, and an image display controller. The recorder records a plurality of images along with movement information related to the movement of an imaging device and/or the movement of a subject within the images. The layout determiner determines the layout of the plurality of images on the basis of the movement information recorded to the recorder. The image display controller controls the display component to display at least two of the plurality of images side by side on the basis of the determination result of the layout determiner.

With this display control device, because the layout of a plurality of images is determined by the layout determiner on the basis of movement information, the image layout can be adjusted according to the movement of the imaging device or the movement of the subject within the images. This means that the direction of these movements can be made to substantially coincide with the layout of the images, and any unnaturalness of images laid out side by side can be reduced.

The display control device according to a second aspect of the present invention is the device of the first aspect, wherein the layout determiner determines the layout of the plurality of images so that the posture of the time vector formed by the two adjacent images will substantially coincide with one component of the direction of movement included in the movement information.

Here, the phrase "time vector" refers to a vector extending from the center of the previously acquired image toward the center of the subsequently acquired image when two images acquired at different times are displayed side by side. The phrase "the posture of the time vector substantially coincides with one component of the movement direction" encompasses a case in which the posture of the time vector completely coincides with one component of the movement information, as well as a case in which the posture of the time vector is shifted with respect to one component of the movement direction to the extent that it is still possible to achieve the effect of displaying images in an easy-to-view manner.

The imaging device according to a third aspect of the present invention includes an imaging optical system arranged to form an optical image of a subject, an imaging component, a display component, a movement detector, and the display control device according to the first or second aspect. The imaging component converts the optical image formed by the imaging optical system into an electrical image signal, and acquires an image of the subject. The display component is capable of displaying a plurality of images acquired by the imaging component side by side. The movement detector acquires movement information related to the movement of the imaging device and/or the movement of the subject within the image.

With this imaging device, because it is equipped with the display control device according to the first or second aspect, any unnaturalness of images laid out side by side can be reduced.

The imaging device according to a fourth aspect of the present invention is the device of the third aspect, wherein the movement detector has a first movement detector configured to acquire first movement information related to the movement of the imaging device. The first movement detector has a first detector configured to detect the rotation of the imaging device with respect to the horizontal axis, a second detector configured to detect the rotation of the imaging device with respect to the vertical axis, and a first information generator configured to generate first movement information on the basis of the detection result of the first and second detectors.

The imaging device according to a fifth aspect of the present invention is the device of the third or fourth aspect, wherein the movement detector has a second movement detector configured to acquire second movement information related to movement of the subject within the images. The second movement detector has a movement vector detector configured to detect the movement vector of the images, and a second information generator configured to generate the second movement information on the basis of the detection result of the movement vector detector.

The imaging device according to a sixth aspect of the present invention is the device of any one of the third to fifth aspects, further including a posture detector configured to acquire posture information related to the posture of the imaging device. The posture information is recorded along with the images in the recorder. The image display controller adjusts the display state of the images with respect to the display component so that the height direction in the images when the images are displayed on the display component substantially coincides with the vertical direction.

The imaging device according to a seventh aspect of the present invention is the device of the sixth aspect, further including an image blur corrector configured to correct blurring of images caused by movement of the imaging device. The image blur corrector has a correcting lens included in the imaging optical system, a first drive frame arranged to drive the correcting lens in a first direction perpendicular to the optical axis, and a second drive frame arranged to drive the correcting lens in a second direction perpendicular to the optical axis and the first direction. The posture detector detects the posture of the imaging device on the basis of the drive force of a first actuator provided to the first drive frame, and a second actuator provided to the second drive frame.

The imaging device according to an eighth aspect of the present invention is the device of any one of the third to seventh aspects, further including a recording controller configured to record a plurality of sequentially captured images to the recorder, with said images recorded in relation to one another.

The printing device according to a ninth aspect of the present invention includes the display control device of the first or second aspect, and a printing component configured to print images displayed on the display component.

With this printing device, because it is equipped with the display control device according to the first or second aspect, any unnaturalness of images laid out side by side can be reduced.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings, which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Overall Configuration of Digital Camera

Figure 1:
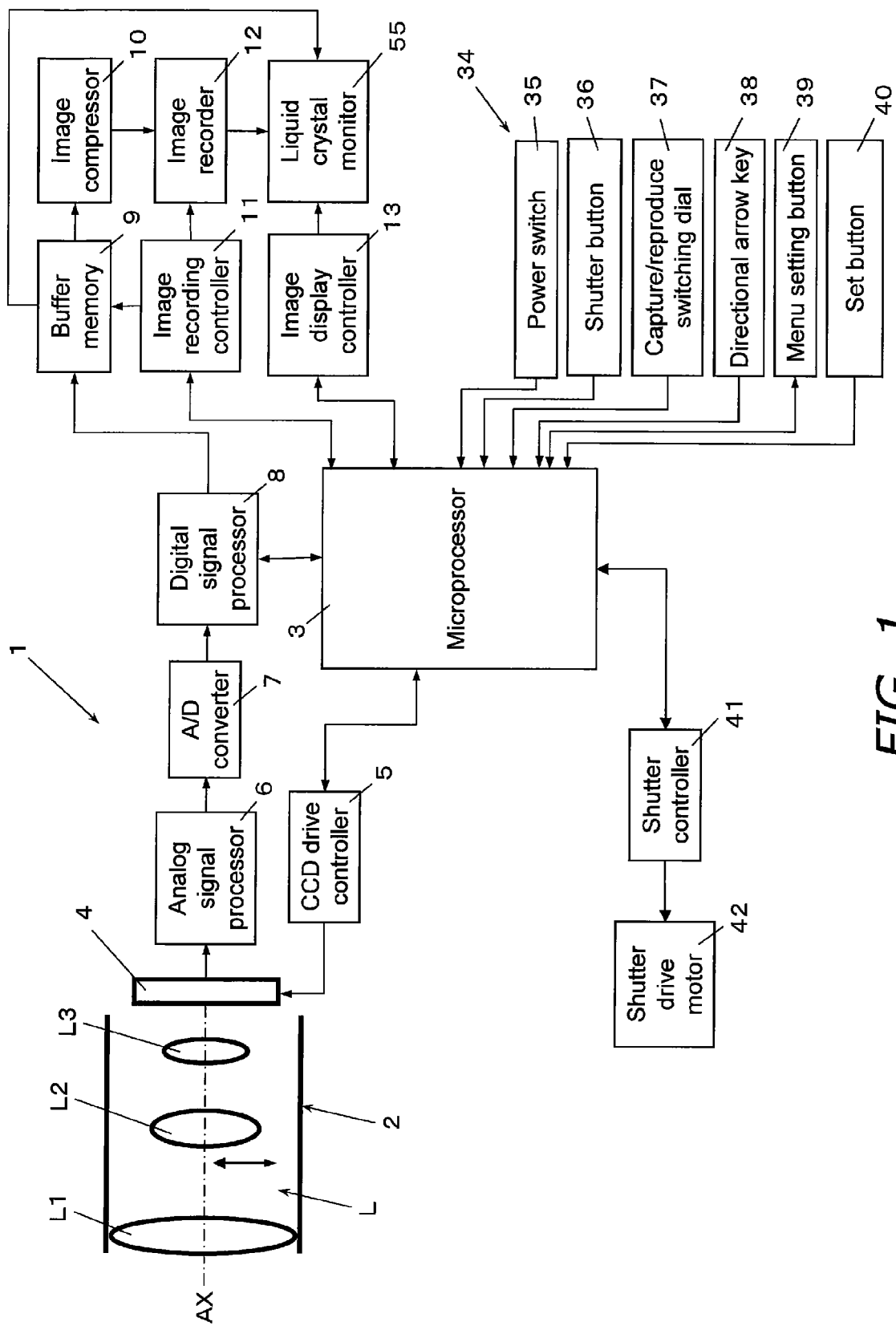
FIG. 1 is a block diagram of the control system of a digital camera.
Figure 2A:
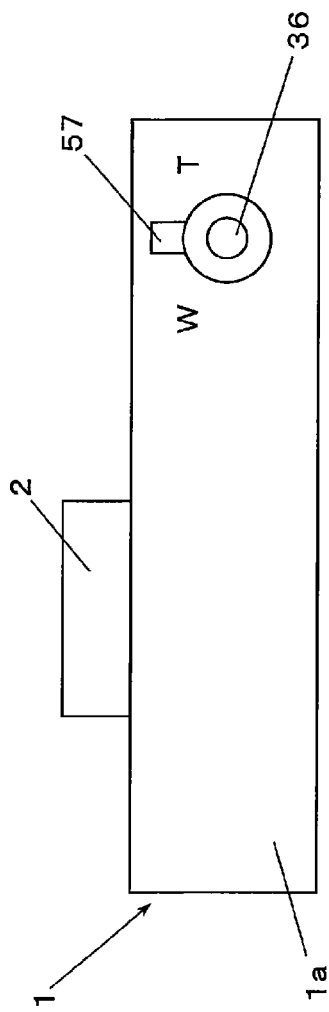
FIG. 2A is a top view of a digital camera.
Figure 2B:
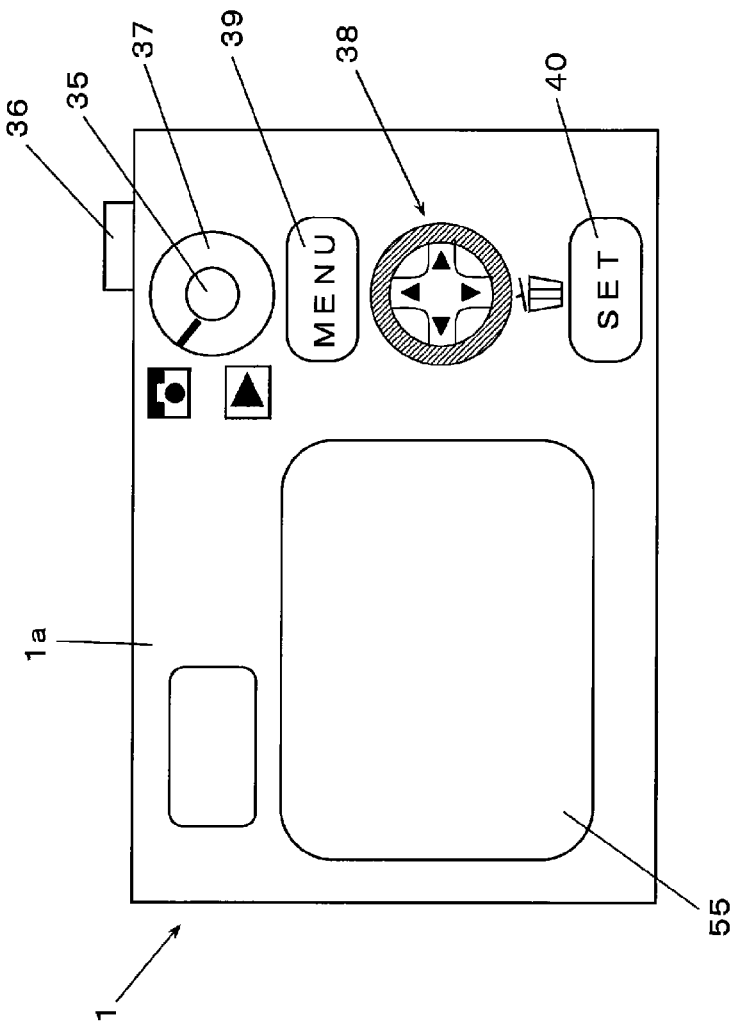
FIG. 2B is a rear view of a digital camera.

The digital camera 1 according to the first embodiment of the present invention will be described through reference to FIGS. 1 and 2. FIG. 1 is a block diagram of the simplified configuration of the digital camera 1. FIG. 2A is a top view of the digital camera 1, and FIG. 2B is a rear view of the digital camera 1. As shown in FIGS. 2A and 2B, we will let the Z axis direction be the direction along the optical axis AX of the digital camera 1, the X-axis direction the left and right direction of the digital camera 1, and the Y-axis direction the up and down direction of the digital camera 1. These directions do not limit how the digital camera 1 is used.

As shown in FIG. 1, the digital camera 1 has an imaging optical system L, a microprocessor 3, an imaging sensor 4, a CCD drive controller 5, a shutter controller 41, and a shutter drive motor 42.

The imaging optical system L is an optical system for forming an optical image of a subject, and includes three lens groups L1, L2, and L3. The imaging optical system L is supported by a lens barrel 2. The first lens group L1 is a lens group for performing focussing, and is provided so as to be capable of movement parallel to the optical axis. The third lens group L3 is a lens group for performing zooming, and is provided so as to be capable of movement parallel to the optical axis AX. The second lens group L2 is a lens group for correcting blurring of the image caused by movement of the digital camera 1, and is provided so as to be capable of movement in a plane perpendicular to the optical axis AX. Blurring of the image can be corrected by using the second lens group L2 to make the optical axis eccentric. The second lens group L2 is included in an image blur correction mechanism 20 (discussed below).

The microprocessor 3 is a unit for controlling the entire digital camera 1, and is connected to various units.

The shutter controller 41 drives the shutter drive motor 42 on the basis of a control signal from the microprocessor 3 in order to operate the shutter. The microprocessor 3 produces this control signal on the basis of a timing signal obtained when a shutter button 36 is pressed.

The imaging sensor 4 is a CCD, for example, and converts an optical image formed by the imaging optical system L into an electrical image signal. The drive of the imaging sensor 4 is controlled by the CCD drive controller 5. The imaging sensor 4 may instead be a CMOS sensor.

As shown in FIG. 1, the digital camera 1 is provided with a control panel 34 in order to input control information from the outside. More specifically, the control panel 34 has a power switch 35, a shutter button 36, a capture/reproduce switching dial 37, a directional arrow key 38, a menu setting button 39, and a set button 40. The microprocessor 3 is connected to the control panel 34, and is able to receive signals from the control panel 34.

As shown in FIGS. 2A and 2B, the imaging optical system L and the lens barrel 2 are disposed on the front face of a housing 1a, and the power switch 35, the capture/reproduce switching dial 37, the directional arrow key 38, the menu setting button 39, the set button 40, and a liquid crystal monitor 55 are disposed on the rear face. The shutter button 36 and a zoom control lever 57 are disposed on the top face of the housing 1a.

The zoom control lever 57 is provided around the shutter button 36 so as to be capable of rotating coaxially with the shutter button 36. The power switch 35 is a switch for switching the power on and off to the digital camera 1. The capture/reproduce switching dial 37 is a dial for switching between photography mode and reproduction mode. The user switches between the modes by rotating a lever on the capture/reproduce switching dial 37. In photography mode, when the zoom control lever 57 is rotated clockwise, the lens barrel 2 is driven to the telephoto side by a zoom motor (not shown), and when this lever is rotated counter clockwise, the lens barrel 2 is driven to the wide angle side by the zoom motor. The operation of the zoom motor is controlled by the microprocessor 3.

The menu setting button 39 is used to display various menus on the liquid crystal monitor 55. The directional arrow key 38 is a button with which the user presses the top, bottom, left, or right side and uses the menu setting button 39 to select the desired category or menu from among the various menus displayed on the liquid crystal monitor 55. The set button 40 is used to execute the options on the various menus.

As shown in FIG. 1, the digital camera 1 further has an analog signal processor 6, an A/D converter 7, a digital signal processor 8, a buffer memory 9, an image compressor 10, an image recording controller 11, the image recorder 12, the image display controller 13, and the liquid crystal monitor 55.

The image signal outputted from the imaging sensor 4 is processed by the analog signal processor 6, the A/D converter 7, the digital signal processor 8, the buffer memory 9, and the image compressor 10, in that order. The analog signal processor 6 subjects the image signal outputted from the imaging sensor 4 to gamma processing or other such analog signal processing. The A/D converter 7 converts the analog signal outputted from the analog signal processor 6 into a digital signal. The digital signal processor 8 subjects the image signal that has been converted into a digital signal by the A/D converter 7 to noise elimination, contour enhancement, or other such digital signal processing. The buffer memory 9 is a random access memory (RAM) and temporarily stores the image signal processed by the digital signal processor 8.

The image signal recorded in the buffer memory 9 is further processed by the image compressor 10 and the image recorder 12, in that order. The image signal recorded to the buffer memory 9 is sent to the image compressor 10 at the command of the image recording controller 11, and the data of the image signal is compressed. The image signal is compressed to a data size that is smaller than that of the original data. The compression method can be, for example, JPEG (Joint Photographic Experts Group). At the same time, the image compressor 10 produces a reduced image signal corresponding to the image used for the thumbnail display, etc. Afterward, the compressed image signal and the reduced image signal are sent to the image recorder 12.

The image recorder 12 is made up of an internal memory (not shown), an internal memory (not shown) provided to the main part of the digital camera 1, a removable memory 51, or the like, and records an image signal, a corresponding reduced image signal, and specific information on the basis of a command from the image recording controller 11, with these signals and information recorded in relation to one another. Examples of the specific information recorded along with these image signals include the date and time an image was captured, focal length information, shutter speed information, aperture value information, and photography mode information. Also, with this digital camera 1, posture information and panning information about the digital camera 1 (discussed below) and movement information about the subject are included as specific information.

The image display controller 13 is controlled by a control signal from the microprocessor 3. At the command of the image display controller 13, the liquid crystal monitor 55 displays as a visible image the image signal recorded to the image recorder 12 or the buffer memory 9. The display state of the liquid crystal monitor 55 may be a state in which just the image signal is displayed, or a state in which the above-mentioned specific information is displayed along with the image signal. The display of the specific information is switched by operation of the menu setting button 39, for example.

Configuration of Image Blur Correction Mechanism

Figure 3:
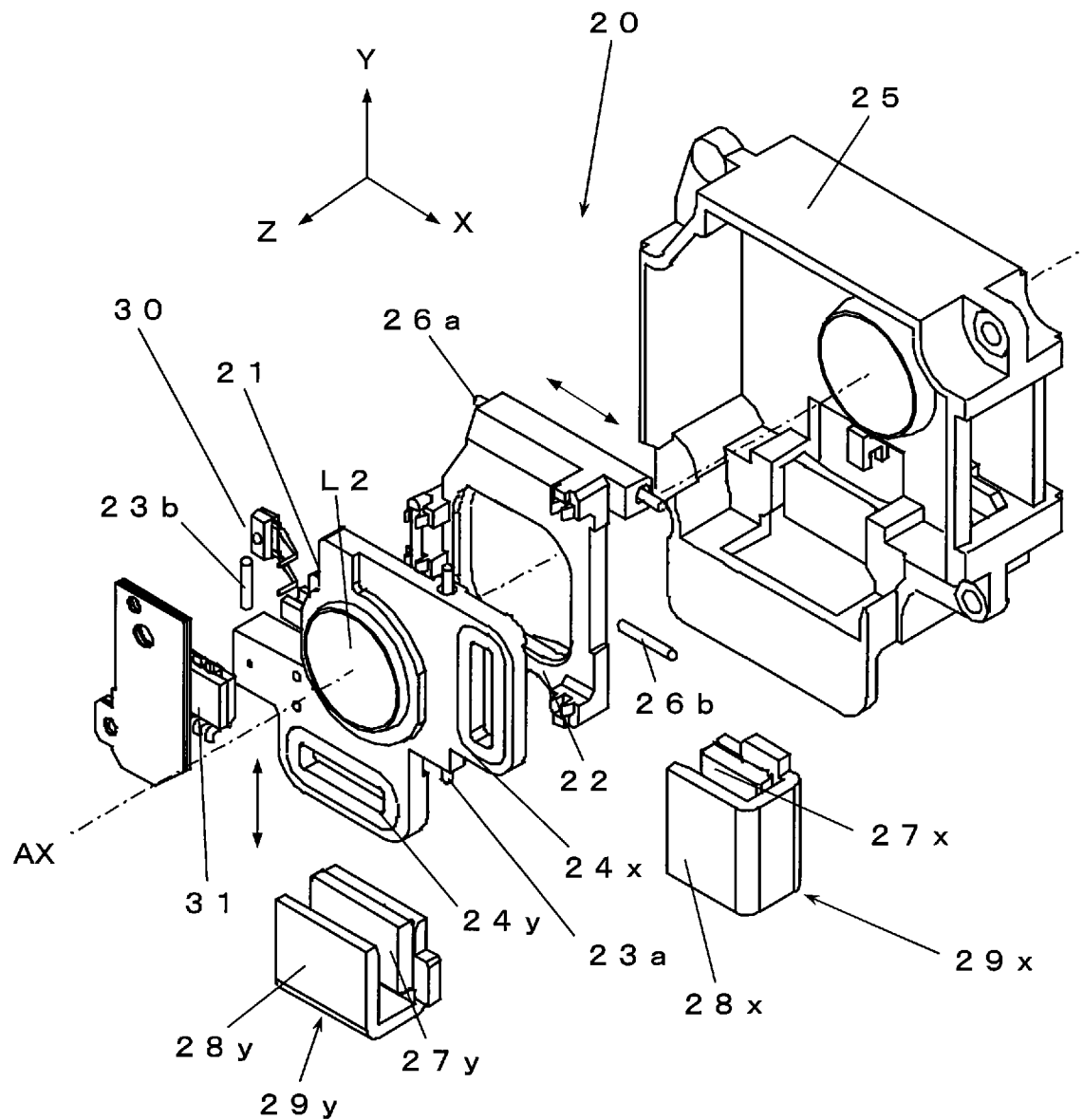
FIG. 3 is a diagram of the hardware configuration of an image blur correction mechanism.

Next, the configuration of the image blur correction mechanism 20 will be described through reference to FIGS. 3 and 4. FIG. 3 is an exploded oblique view of the image blur correction mechanism 20.

When the digital camera 1 is subjected to mechanical vibration, shaking of the user's hands, etc., the optical axis of the light incident on the lens from the subject becomes misaligned with the optical axis of the lens, so the resulting image is not sharp. To prevent this blurring of the image, the image blur correction mechanism 20 is installed in the digital camera 1. More specifically, as shown in FIGS. 3 and 4, the image blur correction mechanism 20 has a pitch support frame 21, a yaw support frame 22, a fixed frame 25, a yaw actuator 29x, a pitch actuator 29y, a light emitting element 30, and a light receiving element 31.

Coils 24x and 24y are provided to the pitch support frame 21. The second lens group L2 and the light emitting element 30 are fixed to the pitch support frame 21. The pitch support frame 21 is supported by the yaw support frame 22 via two pitch shafts 23a and 23b so as to be capable of relative movement in the Y direction.

The yaw support frame 22 is supported by the fixed frame 25 via yaw shafts 26a and 26b so as to be capable of relative movement in the X direction. The yaw actuator 29x has a magnet 27x and a yoke 28x, and is supported on the fixed frame 25. The pitch actuator 29y has a magnet 27y and a yoke 28y, and is supported on the fixed frame 25. The light receiving element 31 is fixed to the fixed frame 25, and receives light emitted from the light emitting element 30. The two-dimensional positional coordinates of the second lens group L2 can be detected by the light emitting element 30 and the light receiving element 31.

Figure 4:
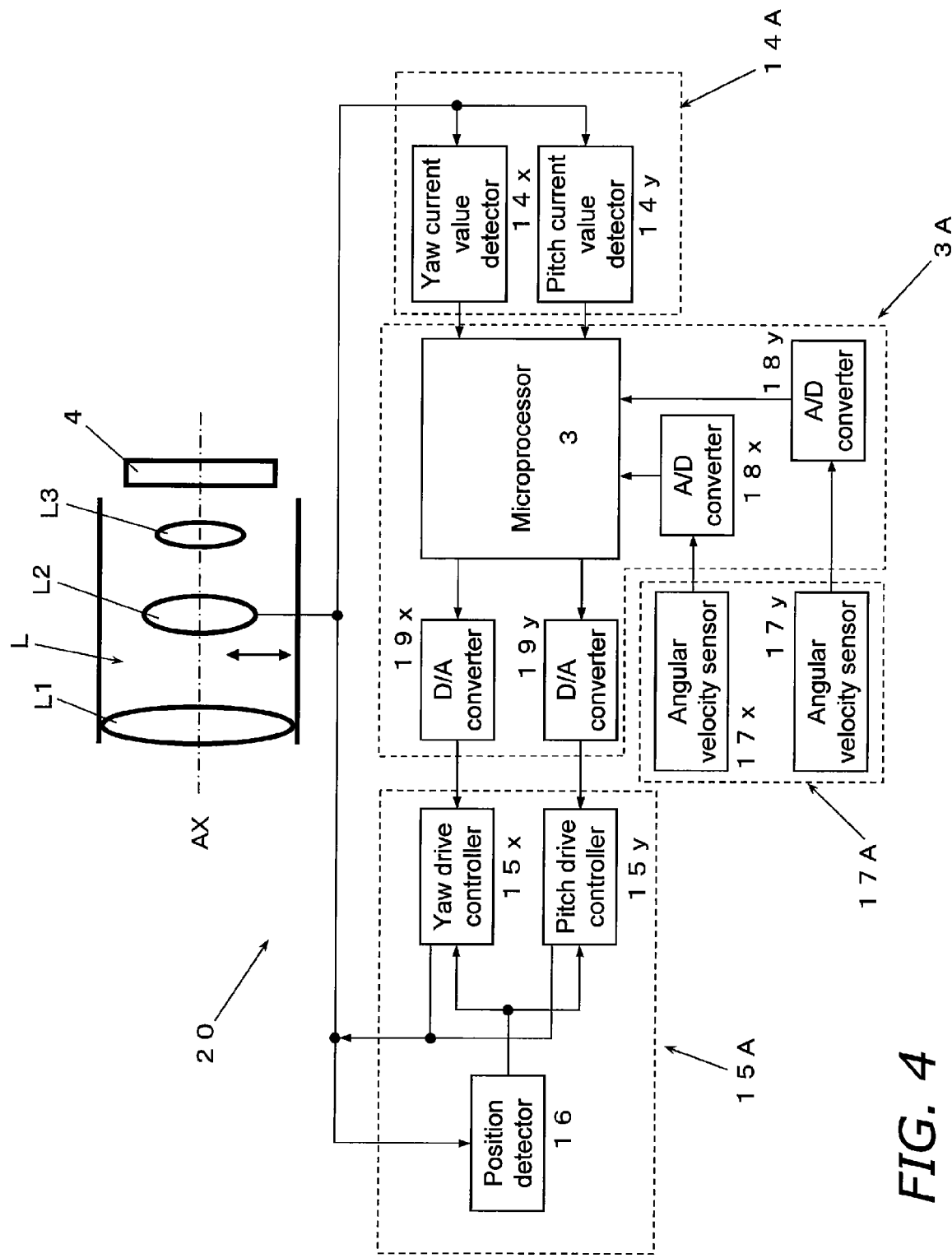
FIG. 4 is an exploded oblique view of an image blur correction mechanism.

As shown in FIG. 4, the image blur correction mechanism 20 further has a movement corrector 15A, a posture detector 14A, and a movement detector 17A (serving as the first movement detector). The movement corrector 15A includes the second lens group L2, a yaw drive controller 15x, a pitch drive controller 15y, and a position detector 16. The drive of the second lens group L2 in two directions perpendicular to the optical axis AX (the X-axis direction and the Y-axis direction) is controlled by the yaw drive controller 15x and the pitch drive controller 15y. The X-axis direction will hereinafter be referred to as the yaw direction, and the Y-axis direction as the pitch direction. The position detector 16 is a unit for detecting the position of the second lens group L2 within the X-Y plane on the basis of the output from the light receiving element 31, and, along with the yaw drive controller 15x and the pitch drive controller 15y, forms a feedback control loop for controlling the operation of the second lens group L2.

The posture detector 14A includes a yaw current value detector 14x and a pitch current value detector 14y. The yaw current value detector 14x detects the value of the current flowing to the coil 24x when the yaw actuator 29x operates (discussed below). The pitch current value detector 14y detects the value of the current flowing to the coil 24y when the pitch actuator 29y operates. The posture of the digital camera 1 can be detected by detecting these current values.

The movement detector 17A includes a yaw angular velocity sensor 17x and a pitch angular velocity sensor 17y. The angular velocity sensors 17x and 17y are sensors for detecting movement of the digital camera 1 itself, including the imaging optical system L, produced by shaking of the user's hands and other such vibrations, etc., and detects movement in the yaw direction and pitch direction. More precisely, the yaw angular velocity sensor 17x is a sensor mainly for detecting the angular velocity of the digital camera 1 around the Y-axis. The pitch angular velocity sensor 17y is a sensor mainly for detecting the angular velocity of the digital camera 1 around the X-axis. The angular velocity sensors 17x and 17y use as a reference the output when the digital camera 1 is stationary, and output positive or negative angular velocity signals depending on the direction in which the digital camera 1 is moving. The outputted signals are processed by a signal processor 3A.

The signal processor 3A includes the microprocessor 3, A/D converters 18x and 18y, and A/D converters 19x and 19y. The signals outputted from the angular velocity sensors 17x and 17y undergo filtering, amplification, or other such processing, and are then converted into digital signals by the A/D converters 18x and 18y and outputted to the microprocessor 3. The microprocessor 3 subjects the output signals of the angular velocity sensors 17x and 17y, which have been taken in via the A/D converters 18x and 18y, to filtering, integration, phase compensation, gain adjustment, clipping, or other such processing. The result of performing this processing is that the microprocessor 3 computes the amount of drive control of the second lens group L2 needed for movement correction, and produces a control signal. The control signal thus produced is outputted through the A/D converters 19x and 19y to the yaw drive controller 15x and the pitch drive controller 15y. As a result, the yaw drive controller 15x and the pitch drive controller 15y drive the second lens group L2 on the basis of the control signal, and the image blurring is corrected.

Panning Mode Signal

Figure 5:
FIG. 5 is a table of panning mode signals.

With this digital camera 1, the angular velocity sensors 17x and 17y can be utilized to acquire a panning mode signal 60 (first movement information) related to the direction of panning, etc. More specifically, during panning, the angular velocities outputted from the angular velocity sensors 17x and 17y have the same sign, and a state continues in which the outputted angular velocities are at or above a specific level. This is utilized by the microprocessor 3 to determine whether or not the angular velocity signals from the angular velocity sensors 17x and 17y are at or above a certain threshold continuously for a specific length of time. The microprocessor 3 produces the panning mode signal 60 shown in FIG. 5 on the basis of this determination result.

For example, if the user pans to the right (facing the subject) during photography, the microprocessor 3 comes to the conclusion of "none" regarding panning in the vertical (Y-axis) direction from the output signal of the pitch angular velocity sensor 17y. Meanwhile, the microprocessor 3 concludes from the output signal of the yaw angular velocity sensor 17x that panning in the horizontal (X-axis) direction is "to the right." Therefore, the panning mode signal 60 is "2."

When the user pans upward and to the left (facing the subject), the microprocessor 3 concludes from the output signal of the pitch angular velocity sensor 17y that the panning in the vertical direction is "upward," and concludes from the output signal of the yaw angular velocity sensor 17x that the panning in the horizontal direction is "to the left." Therefore, the panning mode signal 60 is "4."

Thus, movement of the digital camera 1 during photography can be ascertained by the yaw angular velocity sensor 17x and the pitch angular velocity sensor 17y. The panning mode signal 60 is utilized in deciding the layout of the images displayed on the liquid crystal monitor 55.

Posture Determination Signal

Also, with this digital camera 1, in addition to the panning mode signal 60, a posture determination signal is obtained from the yaw current value detector 14x and the pitch current value detector 14y to determine the posture of the digital camera 1.

Figures 6A, 6B:
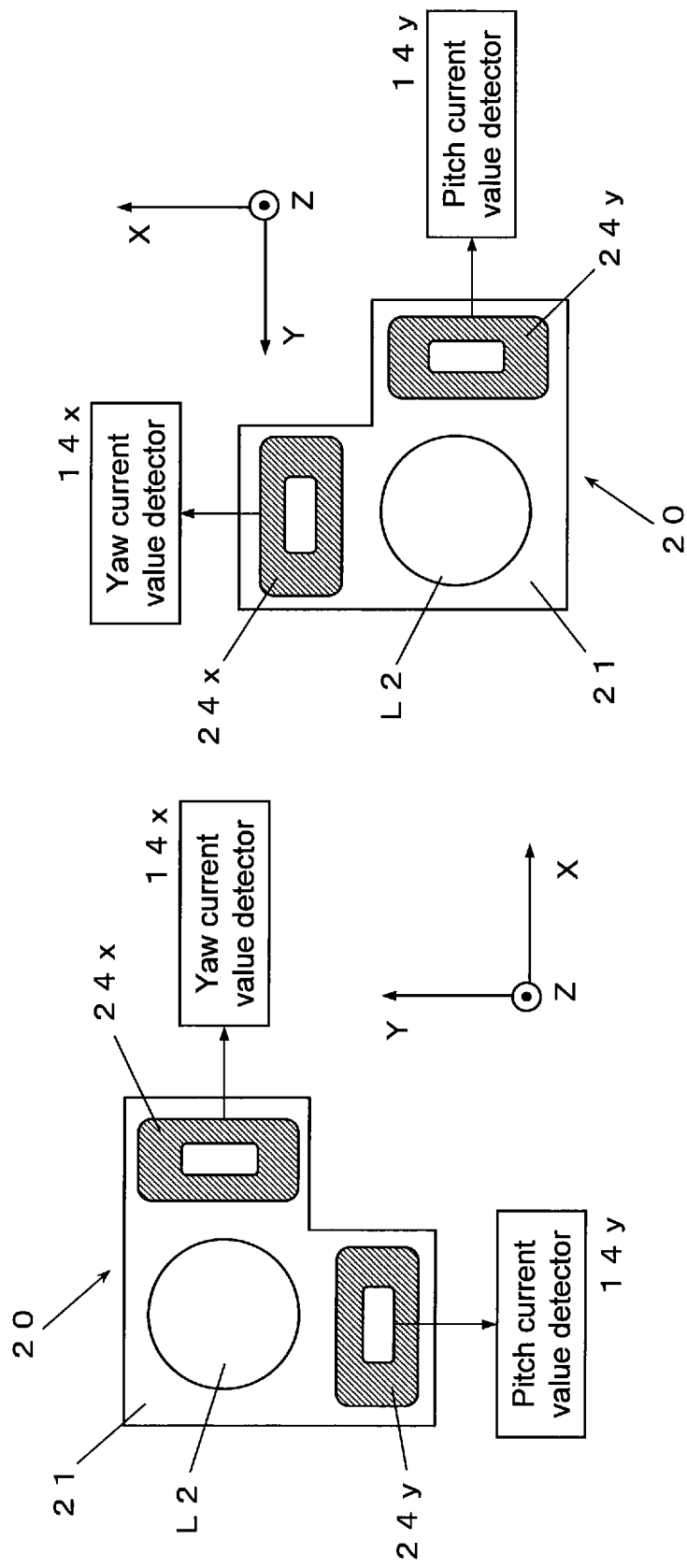
FIG. 6A is a diagram of the posture of an image blur correction mechanism.
FIG. 6B is a diagram of the posture of an image blur correction mechanism.
Figure 7:
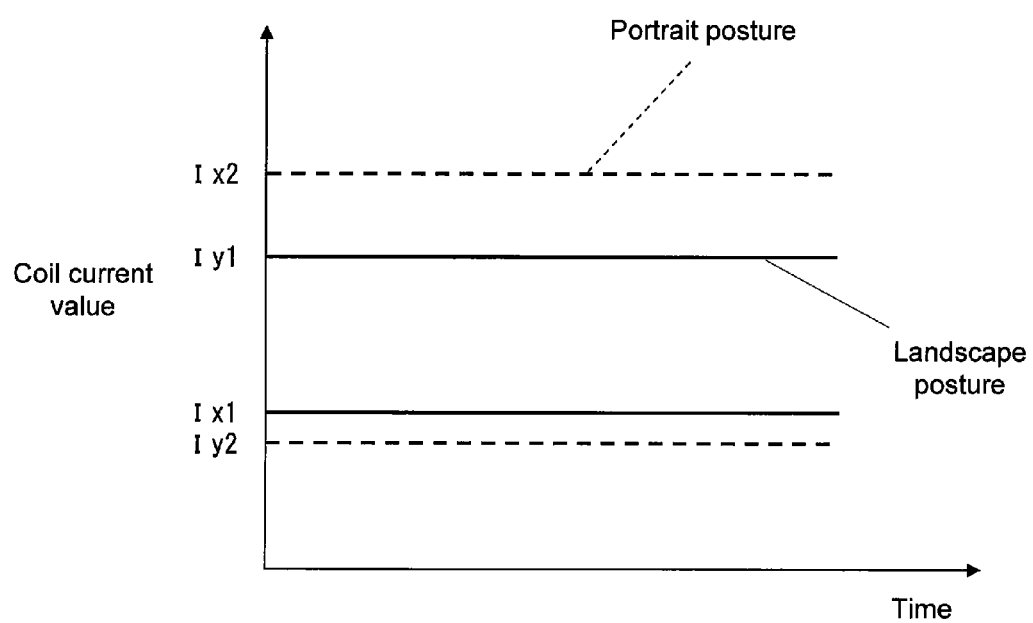
FIG. 7 is a graph of the coil supply current for each photography posture.

Next, the method for detecting the current value with the yaw current value detector 14x and the pitch current value detector 14y will be described through reference to FIGS. 6A, 6B and 7. FIG. 6A shows the posture of the image blur correction mechanism 20 in photography with a landscape posture, and FIG. 6B shows the posture of the image blur correction mechanism 20 in photography with a portrait posture. FIG. 7 is a graph of the coil supply current for each photography posture. The term "landscape posture" as used here means that the lengthwise direction of the liquid crystal monitor 55 (the lengthwise direction of the housing 1a) substantially coincides with the horizontal direction, and "portrait posture" means that the lengthwise direction of the liquid crystal monitor 55 substantially coincides with the vertical direction.

As shown in FIG. 6A, in landscape posture, since the pitch direction substantially coincides with the vertical direction, the pitch support frame 21 that supports the second lens group L2 wants to go down under its own weight in the Y-axis direction. Since the second lens group L2 must be supported at a specific position (near the center of the optical axis AX, for example) in order to obtain a good image, current is supplied to the coil 24y at this point, and the pitch actuator 29y generates electromagnetic force for supporting the pitch support frame 21 on the fixed frame 25. As shown in FIG. 7, the current value at this point is termed Iy1, for example.

Figure 8:
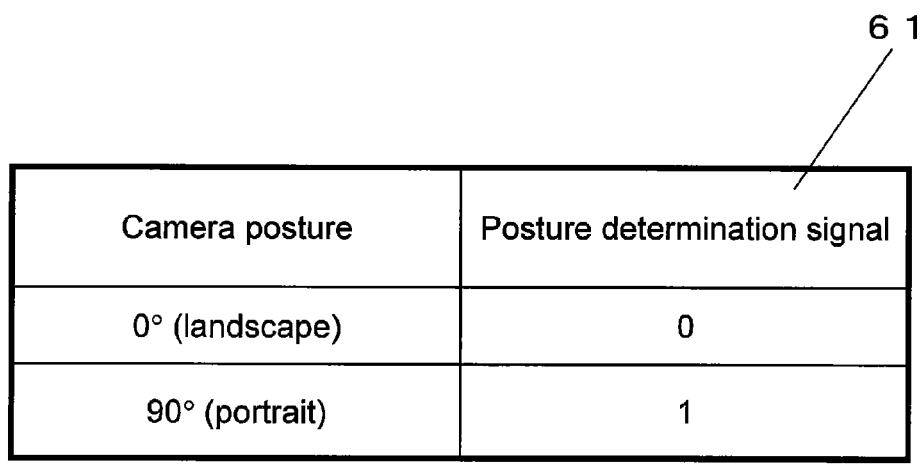
FIG. 8 is a table of posture identification signals.

Meanwhile, since the yaw direction substantially coincides with the horizontal direction, the yaw actuator 29x does not need to generate any extra electromagnetic force to support the weight of the yaw support frame 22 or the pitch support frame 21. Therefore, the current value Ix1 supposed to the coil 24x is smaller than the current value Iy1 supplied to the coil 24y. The microprocessor 3 has a function of comparing the current values detected by the current value detectors 14x and 14y, and a function of determining the posture of the digital camera 1. Therefore, the current values Ix1 and Iy1 are compared by the microprocessor 3, and the posture of the digital camera 1 is determined to be landscape posture as shown in FIG. 8. At this point the posture determination signal 61 is "0," for example.

As shown in FIG. 6B, in portrait posture, since the yaw direction substantially coincides with the vertical direction, the yaw support frame 22 that supports the pitch support frame 21 and the second lens group L2 wants to go downward in the X-axis direction due to its own weight and the weight of these members. Since the second lens group L2 must be supported at a specific position (near the center of the optical axis AX, for example) in order to obtain a good image, current is supplied to the coil 24x at this point, and the yaw actuator 29x generates electromagnetic force for supporting the yaw support frame 22 on the fixed frame 25. As shown in FIG. 7, the current value at this point is termed Ix2, for example.

Meanwhile, since the pitch direction substantially coincides with the vertical direction, the pitch actuator 29y does not need to generate any extra electromagnetic force to support the weight of the pitch support frame 21 or the second lens group L2. Therefore, the current value Iy2 supposed to the coil 24y is smaller than the current value Ix1 supplied to the coil 24x. Therefore, posture of the digital camera 1 is determined by the microprocessor 3 to be portrait posture as shown in FIG. 8. At this point the posture determination signal 61 is "1," for example.

As discussed above, the value of the current flowing to the coils 24x and 24y varies according to the posture of the digital camera 1 during photography. That is, the posture of the digital camera 1 during photography can be ascertained by detecting the value of the current flowing to the coils 24x and 24y. Therefore, the image blur correction mechanism 20 is a mechanism for preventing image blur, and can also be utilized as a posture detector for the digital camera 1.

Sequential Capture Mode

The digital camera 1 has two photography modes: normal mode and sequential capture mode. The sequential capture mode allows a predetermined number of images to be continuously acquired merely by pressing the shutter button 36 one time. Switching to the sequential capture mode is performed with the menu setting button 39, for example.

Figure 9:
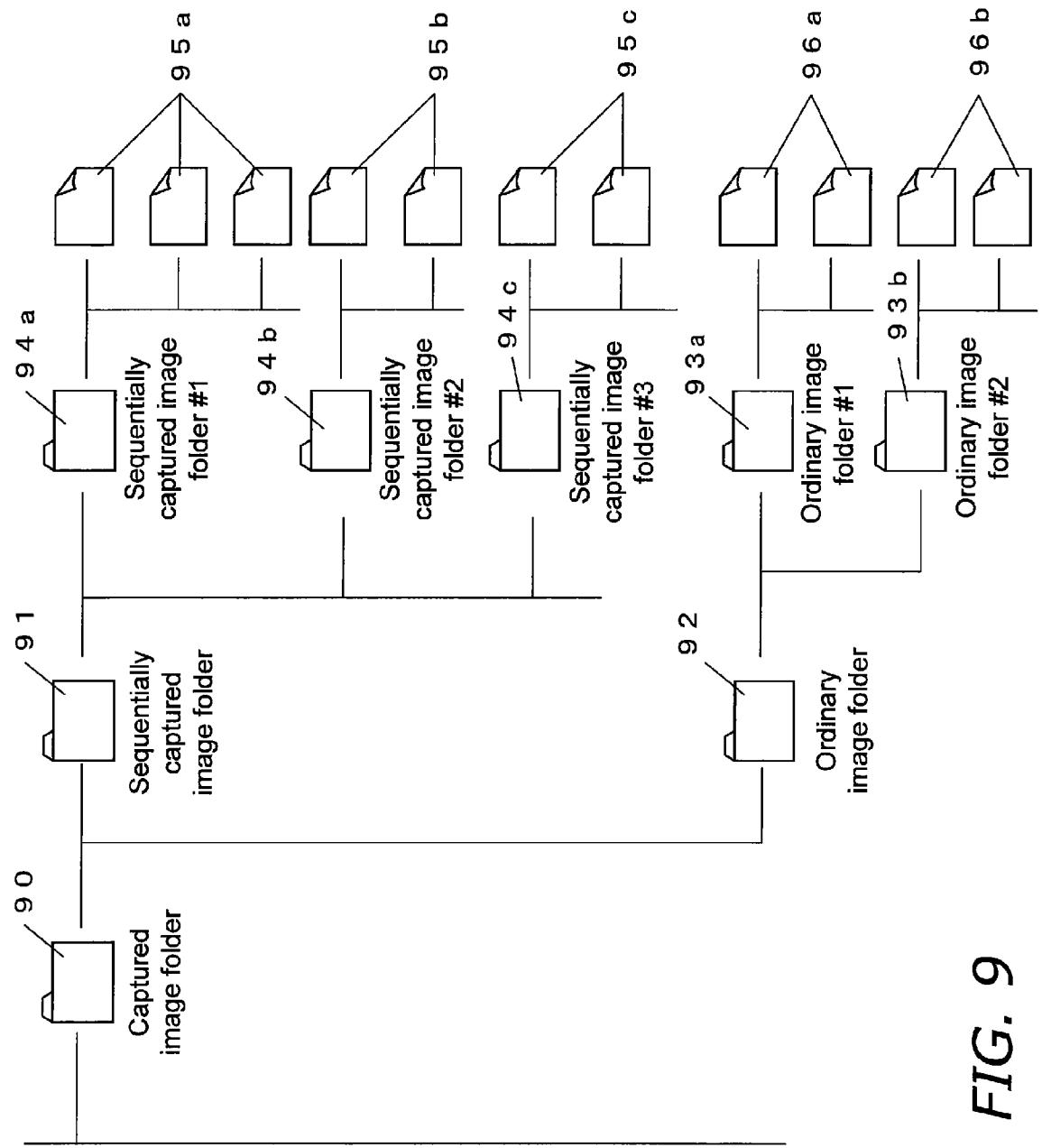
FIG. 9 is a diagram illustrating the file management method for captured images.

The method for managing image files will be described through reference to FIGS. 9 and 10. As shown in FIG. 9, an image folder 90 is formed in the internal memory 50 and the removable memory 51, and a sequentially captured image folder 91 and a normal image folder 92 are formed at a lower hierarchical level. Further, sequentially captured image folders 94a, 94b, 94c, etc., are formed at a lower hierarchical level under the sequentially captured image folder 91, and normal image folders 93a, 93b, etc., are formed at a lower hierarchical level under the normal image folder 92.

In sequential capture mode, a plurality of images acquired in one series of sequential shooting are stored in the sequentially captured image folder 94a as a plurality of image files 95a along with the posture determination signal 61 and the panning mode signal 60. Similarly, a plurality of sequentially captured image files 95b are stored in the sequentially captured image folder 94b, and a plurality of sequentially captured image files 95c are stored in the sequentially captured image folder 94c. Meanwhile, images captured in normal capture mode are stored as image files 96 in the normal image folders 93a, 93b, etc.

Figure 10:
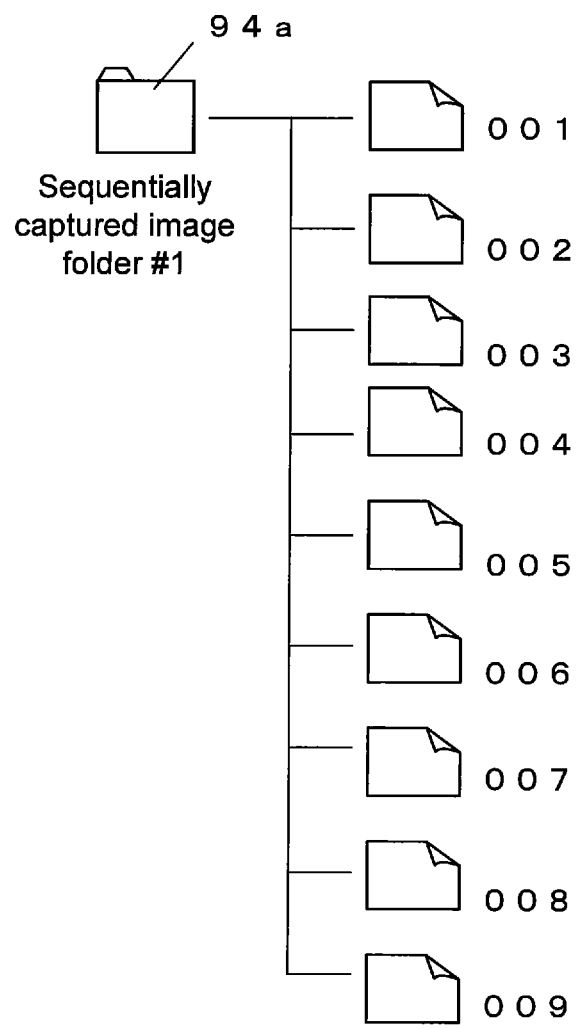
FIG. 10 is a diagram illustrating the file management method for sequentially captured images.

As shown in FIG. 10, nine image files are recorded in one series of sequential shooting to the sequentially captured image folder 94a, and file names of "001," "002," and so on are assigned in the order of the time of capture. The number of images acquired in one series of sequential shooting is not limited to nine.

Because the plurality of images acquired in sequential capture mode are thus stored in a single folder, related images are easier to tell apart.

Image Layout

With this digital camera 1, the layout of the sequentially captured images displayed on the liquid crystal monitor 55 is decided by the microprocessor 3 on the basis of the above-mentioned panning mode signal 60. More specifically, the microprocessor 3 decides the layout of the plurality of images so that the posture of the time vector when the images are laid out will more or less coincide with one component of the direction of the panning operation, according to the type of panning mode signal 60 corresponding to the plurality of sequentially captured images.

The term "time vector" here means the vector extending from the center of a previously acquired image toward the center of a subsequently acquired image when two images acquired at different times are laid out side by side.

Figure 11:
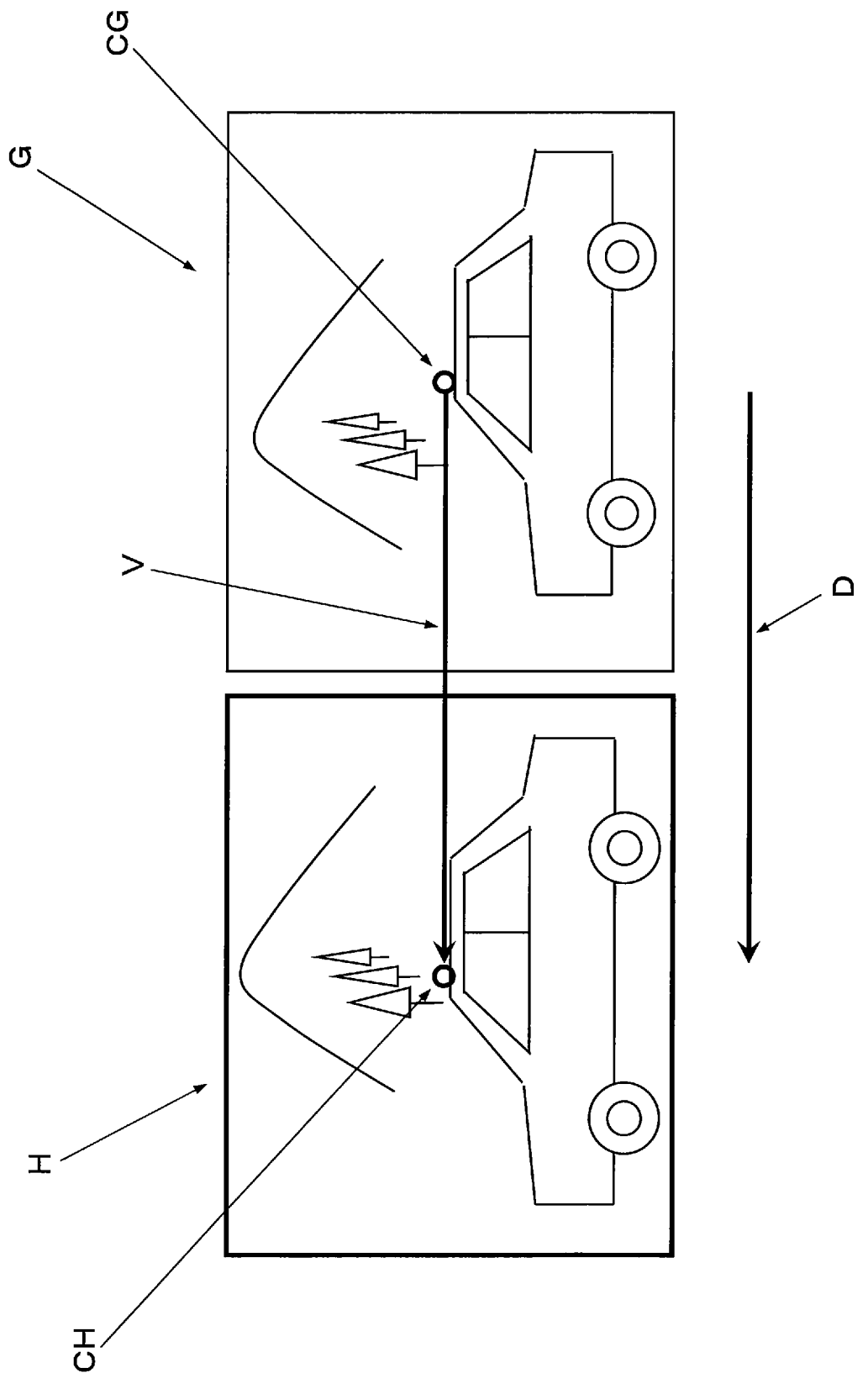
FIG. 11 is a diagram illustrating the relation between the time vector and the panning direction.

For example, as shown in FIG. 11, when a previously acquired first image G and a second image H acquired after the first image G are laid out, the arrow extending from the center CG of the first image G toward the center CH of the second image H indicates the time vector V. Thus, the time vector V expresses the flow of time when a group of images acquired at different times are laid out.

Figure 12:
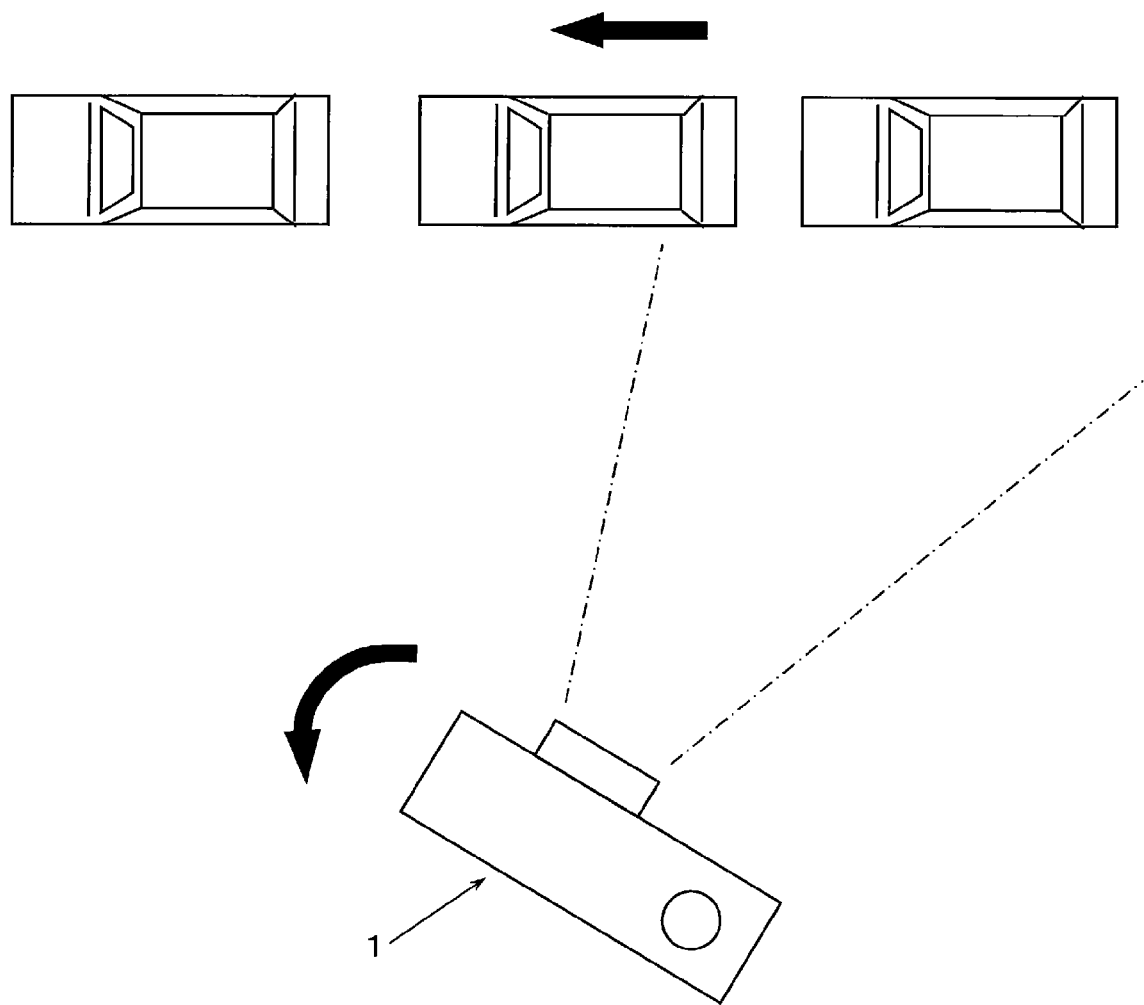
FIG. 12 is a diagram illustrating panning photography.

As shown in FIG. 12, the first image G and the second image H are images captured sequentially while panning to the left over an automobile moving to the left. Therefore, the horizontal component in the direction of the panning operation is the panning direction D.

When the first image G and the second image H are just laid out such that the time vector V substantially coincides with the panning direction D, the first image G and second image H look more natural than when the direction of panning does not coincide with the time vector (such as when it is the opposite direction).

The phrase "the posture of the time vector V substantially coincides with the panning direction D of the panning operation" as used here encompasses not only a case when the posture of the time vector V perfectly coincides with the panning direction D, but also a case when the posture of the time vector V deviates with respect to the panning direction D within a range that still allows any unnaturalness of the displayed image to be reduced.

Operation of Digital Camera

Next, the operation of the digital camera 1 will be described through reference to FIGS. 1 to 8.

When the user wants to take a photograph, first the power switch 35 is turned on, and the capture/reproduce switching dial 37 is switched to photography mode. This puts the digital camera 1 in a photography state. In this photography state, movement of the digital camera 1 is detected by the angular velocity sensors 17x and 17y. The microprocessor 3 sends command signals to the yaw drive controller 15x and pitch drive controller 15y to cancel out any hand shake or the like that occurs. Current corresponding to these command signals is supplied to the coils 24x and 24y of the pitch support frame 21. The pitch support frame 21 is moved within the X-Y plane, perpendicular to the optical axis AX, by the electromagnetic force generated by the actuators 27x and 27y and the supplied current. Specifically, the image blur correction mechanism 20 moves the second lens group L2 within a plane perpendicular to the optical axis AX. Also, the light receiving element 31 is used to detect the position of the pitch support frame 21. This allows the user to correct the optical image incident on the imaging sensor 4 via the imaging optical system L, and makes it possible to acquire a good image with reduced blurring.

(1) Determining Posture

The photography posture of the digital camera 1 is determined as follows. Here, we will let the reference posture of the digital camera 1 be a landscape posture, and will let the angle of rotation around the optical axis AX in landscape posture be 0°. In this case, portrait posture is a state in which the digital camera 1 is rotated 90° around the optical axis AX from the landscape posture.

We will describe a case in which the user photographs a subject that is wider than it is tall, such as scenery, in landscape posture. The posture of the digital camera 1 is determined from the current detection values of the yaw current value detector 14x and the pitch current value detector 14y. In FIG. 7, when a photograph is taken in landscape posture, that is, at a posture of 0°, the value Ix1 of current flowing to the coil 24x of the image blur correction mechanism 20 and the value Iy1 of current flowing to the coil 24y are detected by the yaw current value detector 14x and the pitch current value detector 14y. The detected current values Ix1 and Iy1 are compared by the microprocessor 3. In this case, as shown in FIG. 7, since the current value Ix1 is smaller than the current value Iy1, the microprocessor 3 determines that the digital camera 1 is in landscape posture.

When the user presses the shutter button 36 in this state, a horizontal image is acquired. The captured image is recorded to the image recorder 12. Here, as shown in FIG. 8, the image recording controller 11 adds a "0," which indicates that the photography posture of the digital camera 1 is landscape posture (0°), as the posture determination signal 61 to the image signal outputted from the buffer memory 9. This posture determination signal 61 is recorded to the header or footer portion of the image signal, for example. The recording of the posture determination signal 61 may be carried out when the image signal is outputted from the buffer memory 9, or may be carried out at the image recorder 12 after the image signal has been recorded to the image recorder 12.

Meanwhile, when the user wants to photograph a subject that is taller than it is wide, such as a person, in portrait posture, just as in the case of landscape posture, the posture of the digital camera 1 is determined by the microprocessor 3 on the basis of the current values detected by the yaw current value detector 14x and the pitch current value detector 14y. In FIG. 7, when a photograph is taken in portrait posture, the value Ix2 of current flowing to the coil 24x of the image blur correction mechanism 20 and the value Iy2 of current flowing to the coil 24y are detected by the yaw current value detector 14x and the pitch current value detector 14y. The detected current values Ix2 and Iy2 are compared by the microprocessor 3. In this case, as shown in FIG. 7, since the current value Iy2 is smaller than the current value Ix2, the microprocessor 3 determines that the digital camera 1 is in portrait posture.

When the user presses the shutter button 36 in this state, a vertical image is acquired. The captured image is recorded to the image recorder 12. Here, the image recording controller 11 adds a "1," which indicates that the photography posture of the digital camera 1 is portrait posture, as the posture determination signal 61 to the image signal outputted from the buffer memory 9.

(2) Determining Panning Mode

Next, a case in which the user follows a moving subject to capture images sequentially by panning will be described. When the user presses the menu setting button 39, various menu images are displayed on the liquid crystal monitor 55. When the directional arrow key 38 is used to select the sequential capture mode from among the various menus displayed, the digital camera 1 changes to sequential capture mode.

As shown in FIG. 12, when sequential images are captured of an automobile moving to the left, the user pans the digital camera 1 to the left and presses the shutter button 36 while tracking the movement of the automobile. As a result, a plurality of images sequentially captured by panning (nine images in this embodiment) are temporarily stored in the buffer memory 9 and recorded to the image recorder 12. At this point, the panning mode signal 60 is recorded along with the nine images when the shutter button 36 is pressed.

Here, since the direction in which the digital camera 1 faces is changing to the left, the microprocessor 3 determines from the output signal of the angular velocity sensor 17y that vertical panning is "none," and determines from the output signal of the angular velocity sensor 17x that horizontal panning is "to the left." Consequently, "1" is recorded as the panning mode signal 60 along with the plurality of images.

Also, the above-mentioned posture determination signal 61 is recorded along with the panning mode signal 60. In this case, since the posture of the digital camera 1 is landscape posture, "0" is recorded as the posture determination signal 61 along with the plurality of images.

(3) Operation in Sequential Capture Mode

Figure 13:
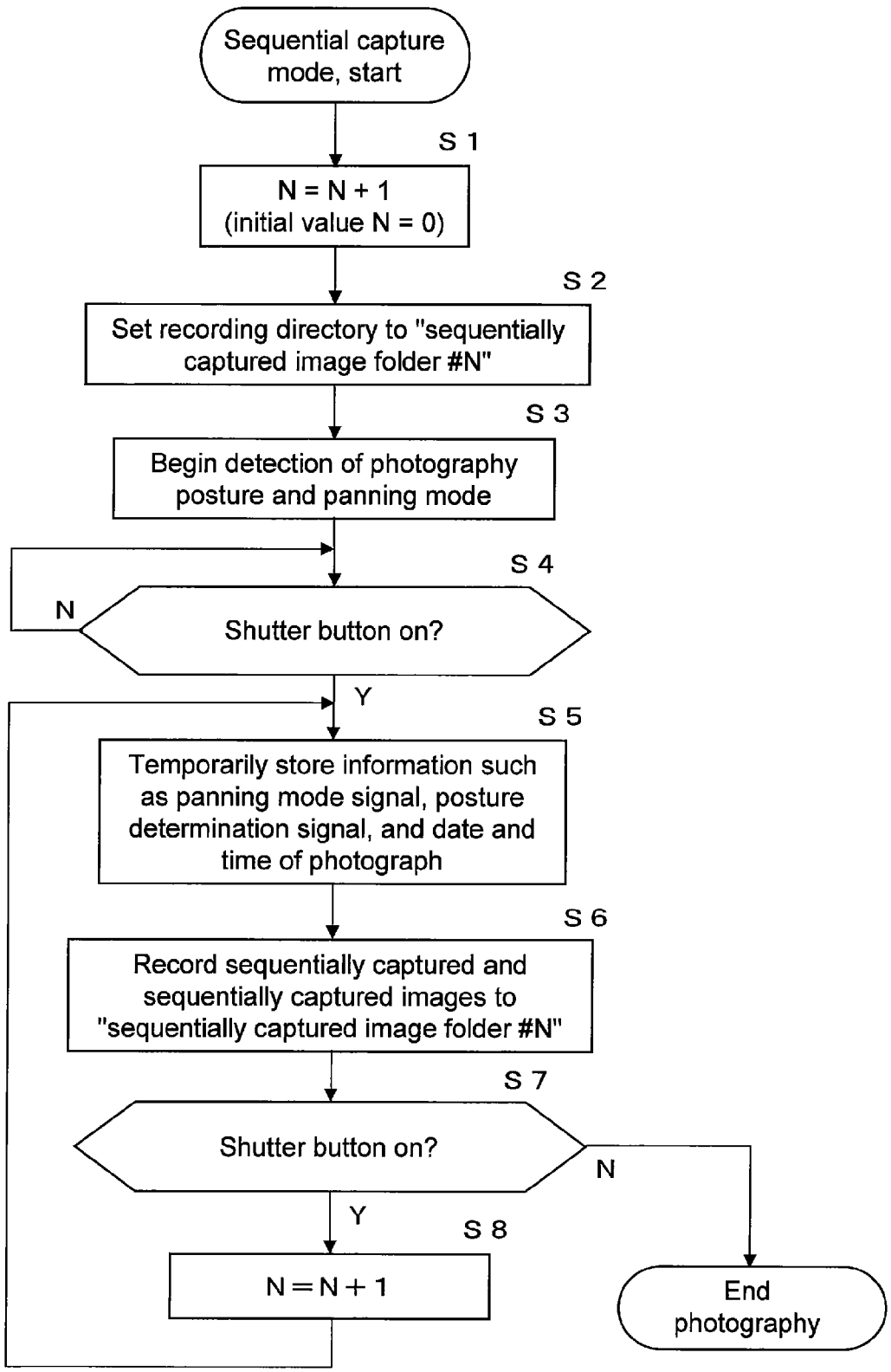
FIG. 13 is a flowchart of a photography method.
Figure 14:
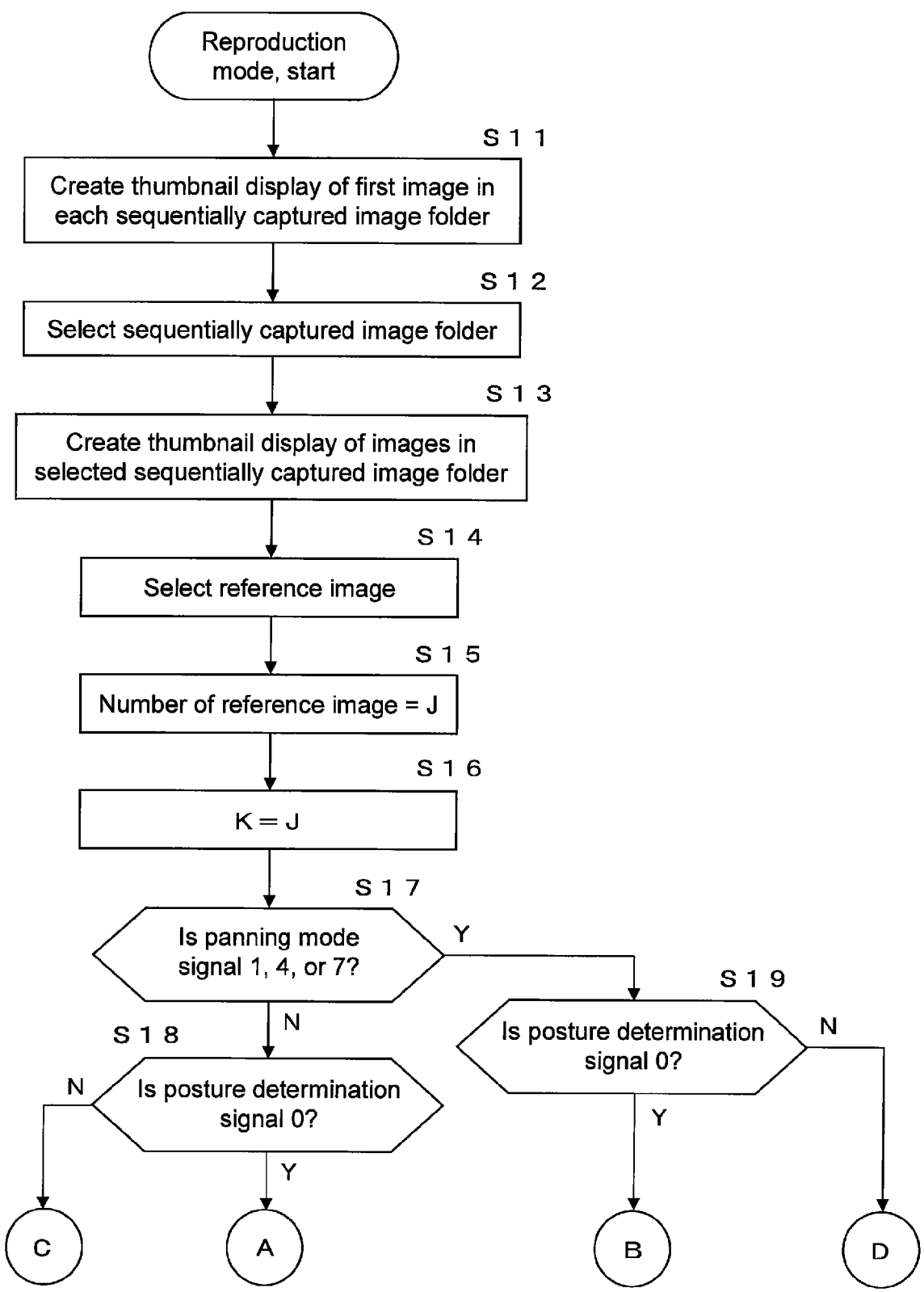
FIG. 14 is a flowchart of a reproduction method.

FIG. 13 is a flowchart of sequential capture mode, from the start of image recording until the recording ends. First, to set the camera to sequential capture mode, the user presses the menu setting button 39, and various menus are displayed on the liquid crystal monitor 55. The digital camera 1 changes to sequential capture mode when that mode is selected from among the various menus displayed.

When sequential capture mode has been selected, the microprocessor 3 adds 1 to a constant N of an initial value 0 (step S1), and the directory to which the images will be recorded is set to sequentially captured image folder #1 (S2). The microprocessor 3 commences detection of the posture determination signal 61 and the panning mode signal 60 of the digital camera 1 (S3).

Then, the system waits for the shutter button 36 to be pressed (S4), and when the shutter button 36 is pressed, the panning mode signal 60, the posture determination signal 61, and various information such as the date and time of the photograph are temporarily stored (S5), and a plurality of images are continuously acquired at a specific timing (S6). Here, when the shutter button 36 is pressed once, nine images are captured sequentially, for example. The plurality of images acquired by sequential capture are recorded along with the various information mentioned above to the sequentially captured image folder #1 of the image recorder 12 (S6). More specifically, as shown in FIGS. 9 and 10, the plurality of images are stored as the image file 95a in the sequentially captured image folder 94a.

After this, it is determined whether or not the shutter button 36 still being held down (S7), and if the shutter button 36 is being pressed, 1 is added to the constant N (S8), and sequential capture and image recording are once again carried out (S5, S6). If the shutter button 36 has not been pressed, the sequential capture mode is ended.

(4) Operation in Reproduction Mode

Next, the method for reproducing the obtained images when they are displayed on the liquid crystal monitor 55 will be described through reference to FIGS. 14 to 18. FIGS. 14 to 18 are flowcharts of the reproduction mode. FIG. 19 is an example of a thumbnail display of a sequentially captured image folder.

First, to produce a thumbnail display of the captured images on the liquid crystal monitor 55 for each image folder, after the power switch 35 is turned on, the capture/reproduce switching dial 37 is turned to reproduction mode. This begins the reproduction mode.

As shown in FIG. 19, thumbnail images of the sequentially captured image folders #1 to #9 are displayed on the liquid crystal monitor 55 (S11). These sequentially captured image folders contain the panning mode signal 60 and the posture determination signal 61 along with the images. For example, the plurality of images stored in the sequentially captured image folder #1 are images captured sequentially, while panning to the left, of an automobile moving to the left, while the digital camera 1 is in landscape posture. Therefore, along with these images, "0" is recorded as the 61, and "1" as the panning mode signal 60. The front image (the image acquired first) is displayed in thumbnail as a representative image.

Also, the plurality of images stored in the sequentially captured image folder #2 are images captured sequentially while panning to the right over a car moving to the right, with the digital camera 1 in landscape posture. Therefore, along with these images, a "0" is recorded as the posture determination signal 61, and a "2" as the panning mode signal 60.

Further, the plurality of images stored in the sequentially captured image folder #3 are images captured sequentially while panning to the right over a child moving to the right, with the digital camera 1 in portrait posture. Therefore, a "1" is recorded as the posture determination signal 61, and a "2" as the panning mode signal 60. The front image is displayed in thumbnail as a representative image.

Here, the front image in the thumbnail display is displayed on the liquid crystal monitor 55 in a state of being restored to the same posture as during photography, on the basis of the posture determination signal 61. More specifically, when the posture determination signal 61 is "0" (in the case of thumbnail images of the sequentially captured image folders #1 and #2 shown in FIG. 19), the image has been captured in landscape posture. Therefore, a control signal is sent from the microprocessor 3 to the image display controller 13 so that a horizontal image will be displayed on the liquid crystal monitor 55 when the digital camera 1 is in landscape posture, and the operation of the liquid crystal monitor 55 is controlled by the image display controller 13. As a result, an image is displayed in horizontal format on the liquid crystal monitor 55. Also, when the posture determination signal 61 is "1" (in the case of a thumbnail image of the sequentially captured image folder #3 shown in FIG. 19), the image has been captured in portrait posture. Therefore, just as when the posture determination signal 61 is "0," a vertical image (an image rotated 90°) is displayed on the liquid crystal monitor 55 when the digital camera 1 is in portrait posture. In FIG. 19, the thumbnail images for sequentially captured image folders #4 to #9 are not depicted.

Next, the directional arrow key 38 is used to select a sequentially captured image folder from among the front images of the image folders in thumbnail display (S12). The folder is selected using the directional arrow key 38 and the set button 40. When the sequentially captured image folder #1 shown in FIG. 19 is selected, the nine thumbnail images in the sequentially captured image folder #1 are displayed on the liquid crystal monitor 55 (S13).

Next, the directional arrow key 38 and the set button 40 are used to select the image that will serve as a reference (reference image) (S14). The microprocessor 3 inputs the number of the reference image as reference number J, and inputs the reference number J as the comparative number K (S15, S16).

To optimize the image display layout according to the panning operation during photography, the panning mode signal 60 is confirmed by the microprocessor 3 (S17). More specifically, the microprocessor 3 determines whether the panning mode signal 60 is "1," "4," or "7" (S17). These panning mode signals 60 mean that the camera is being panned at least to the left, so if this condition is met, the microprocessor 3 adjusts the layout of the images through the image display controller 13 so that the time vector of images disposed side by side will face to the left. If this condition is not met, the microprocessor 3 adjusts the layout of the images through the image display controller 13 so that the time vector of images disposed side by side will face to the right.

Also, after the confirmation of the panning mode signal 60, the posture determination signal 61 is checked (S18, S19). More specifically, the microprocessor 3 determines whether or not the posture determination signal 61 is "0" (S18, S19). If the posture determination signal 61 is "0," then sequential capture is being performed in landscape posture, so a horizontal image is displayed on the liquid crystal monitor 55 in order to restore the view to the posture during photography. Meanwhile, if the posture determination signal 61 is "1," then sequential capture is being performed in portrait posture, so a vertical image is displayed on the liquid crystal monitor 55 in a state of 90° rotation order to restore the view to the posture during photography.

The flow will now be described in detail for every condition of step S17.

A) In Landscape Posture

When the Panning Horizontal Component is "To the Left"

Figure 15:
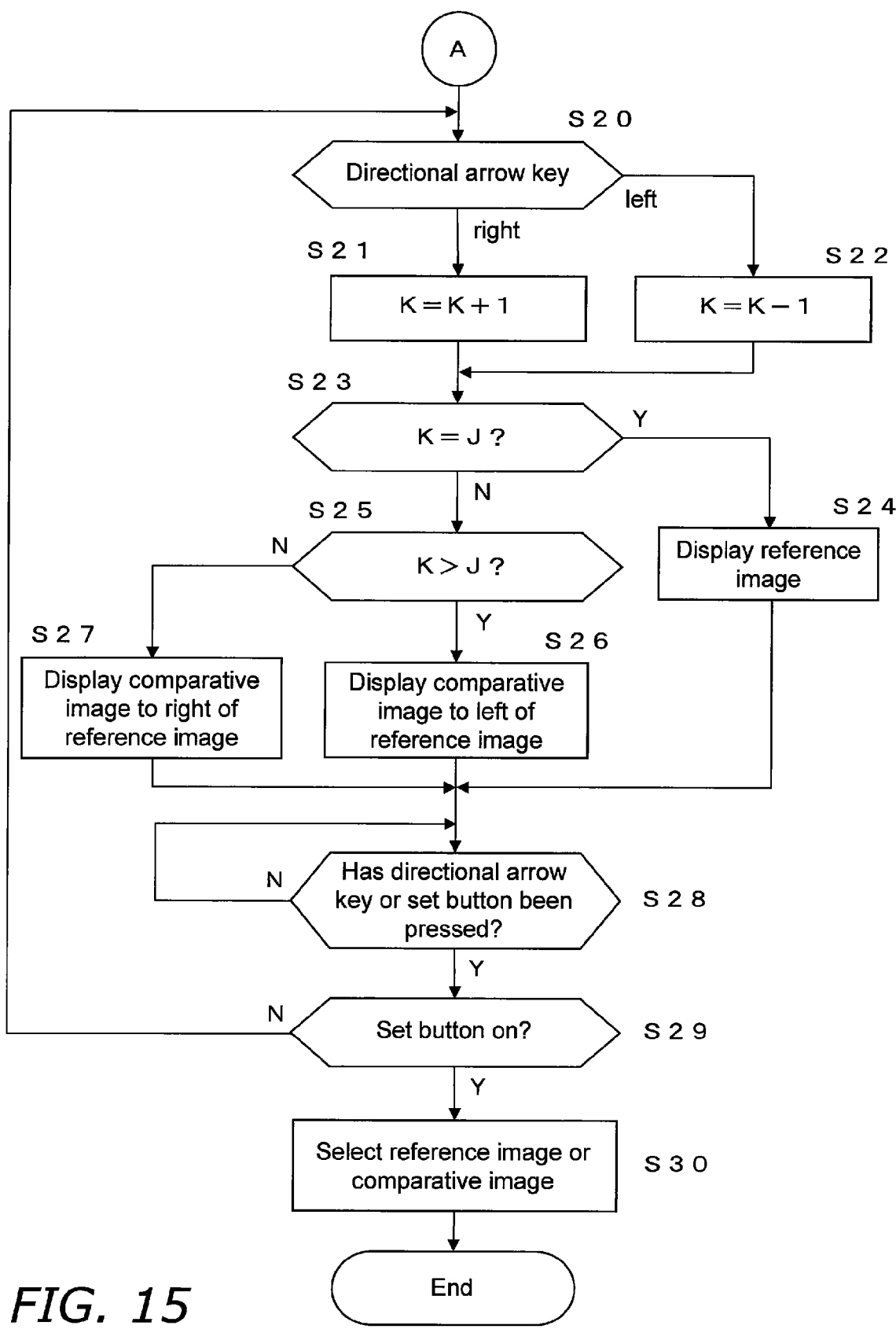
FIG. 15 is a flowchart of a reproduction method.

If the microprocessor 3 determines that the panning mode signal 60 in step S17 is either "1," "4," or "7," and the microprocessor 3 determines that the posture determination signal 61 in step S18 is "0," then image display is performed on the basis of the flow A shown in FIG. 15. More specifically, as shown in FIG. 15, the directional arrow key 38 is used to select a comparative image. For instance, when the directional arrow key 38 (or the dial disposed around the outside of the directional arrow key 38) is operated on the right side (turned to the right), the microprocessor 3 adds 1 to the comparative number K and sets a new comparative number K (S20, S21). On the other hand, if the directional arrow key 38 (or the dial) is operated on the left side (turned to the left), the microprocessor 3 subtracts 1 from the comparative number K and sets a new comparative number K (S20, S22).

Figure 21:
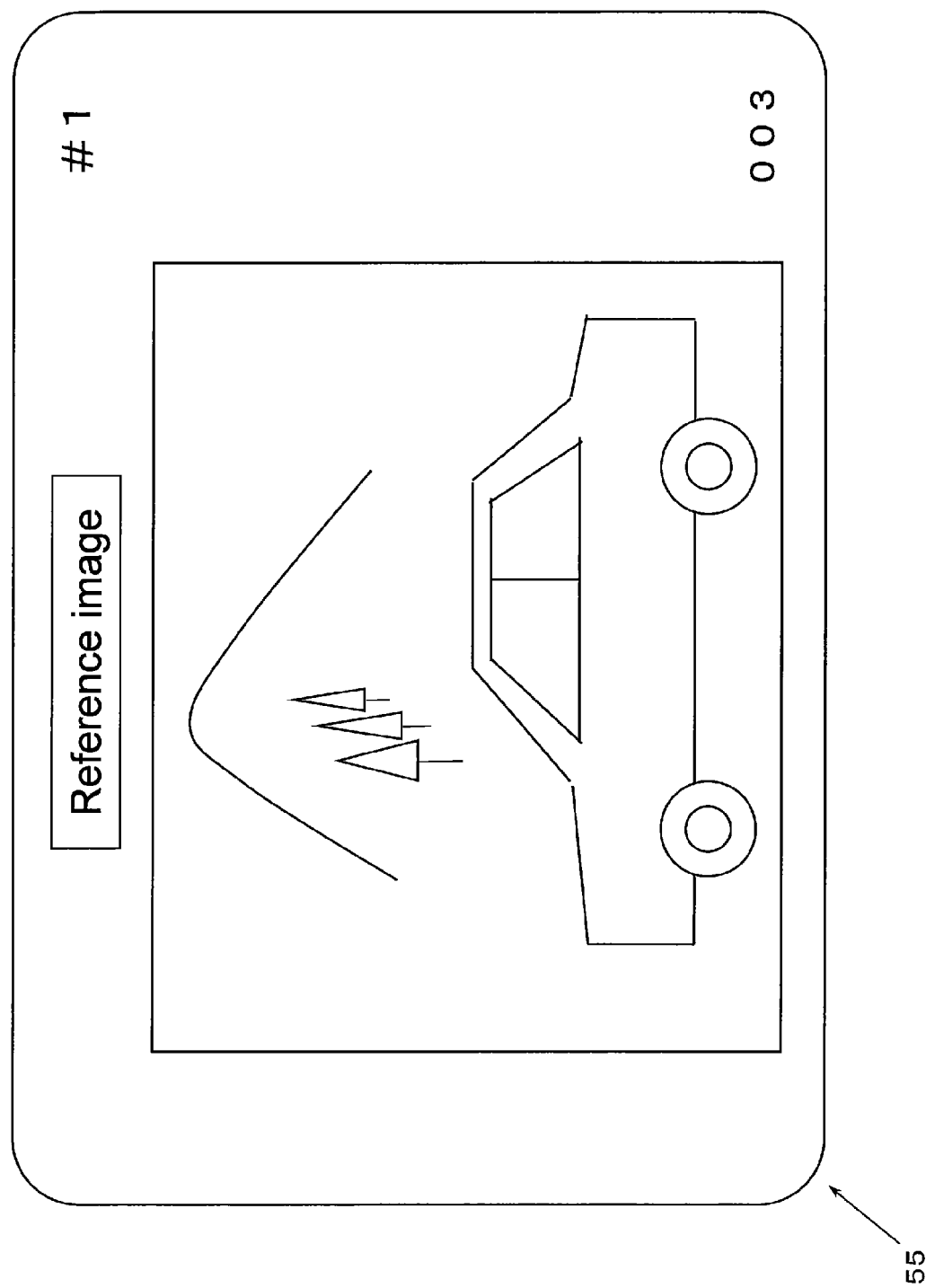
FIG. 21 is an example of the display of a reference image.

Next, the image is displayed on the liquid crystal monitor 55 by the image display controller 13 on the basis of the reference number J and the comparative number K. More specifically, as shown in FIG. 21, when the comparative number K is the same as the reference number J, only the reference image is displayed on the liquid crystal monitor 55 by the image display controller 13 (S23, S24).

If the reference number J is different from the comparative number K, however, the reference number J and the comparative number K are compared to find which is larger (S25). If the comparative number K is greater than the reference number J, then the comparative image is an image acquired at a later time than the reference image. Meanwhile, in this flow, this corresponds to a case when the horizontal component of the panning is "to the left." Therefore, the comparative image is displayed to the left of the reference image on the liquid crystal monitor 55 so that the posture of the time vector when the reference image and comparative image are laid out next to each other will be the same left direction as the horizontal component of the panning (S26). At this point the images displayed on the screen are horizontal because the photography posture was landscape posture.

If the comparative number K is less than the reference number J, then the comparative image is an image acquired at an earlier time than the reference image. Therefore, the comparative image is displayed to the right of the reference image on the liquid crystal monitor 55 so that the posture of the time vector when the reference image and comparative image are laid out next to each other will be the same left direction as the horizontal component of the panning (S27). At this point the images displayed on the screen are horizontal because the photography posture was landscape posture.

Figure 22:
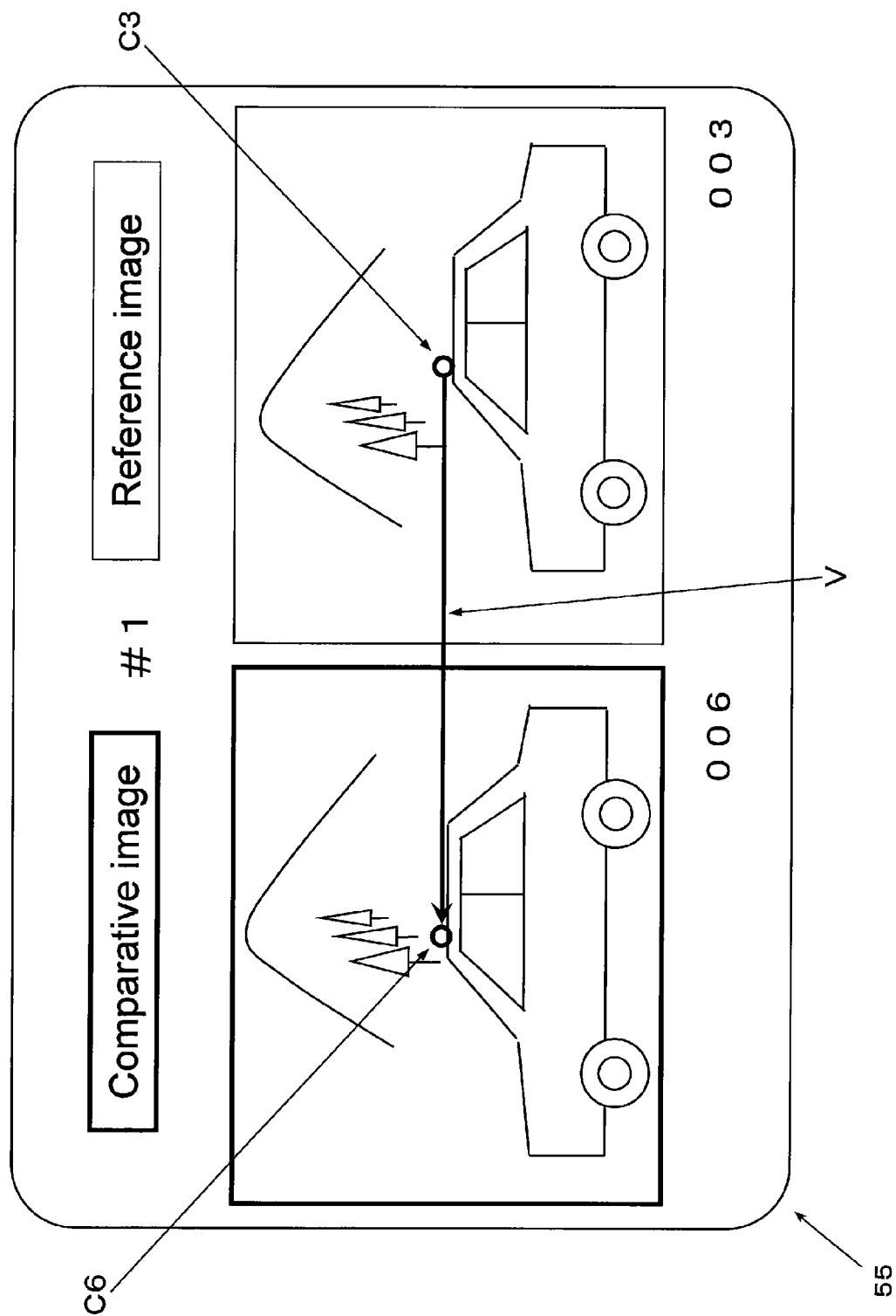
FIG. 22 is an example of the display of a reference image and a comparative image (sequentially captured image folder #1)

For example, when the sequentially captured image folder #1 has been selected, since the panning mode signal 60 is "1" as mentioned above, processing is carried out by this flow A. If we let reference number J="003" and comparative number K="006," then K>J. Accordingly, as shown in FIG. 22, the comparative image 006 is displayed to the left of the reference image 003 on the liquid crystal monitor 55. In this case, the time vector V extending from the center C3 of the reference image to the center C6 of the comparative image substantially coincides with the direction of the panning.

Figure 23:
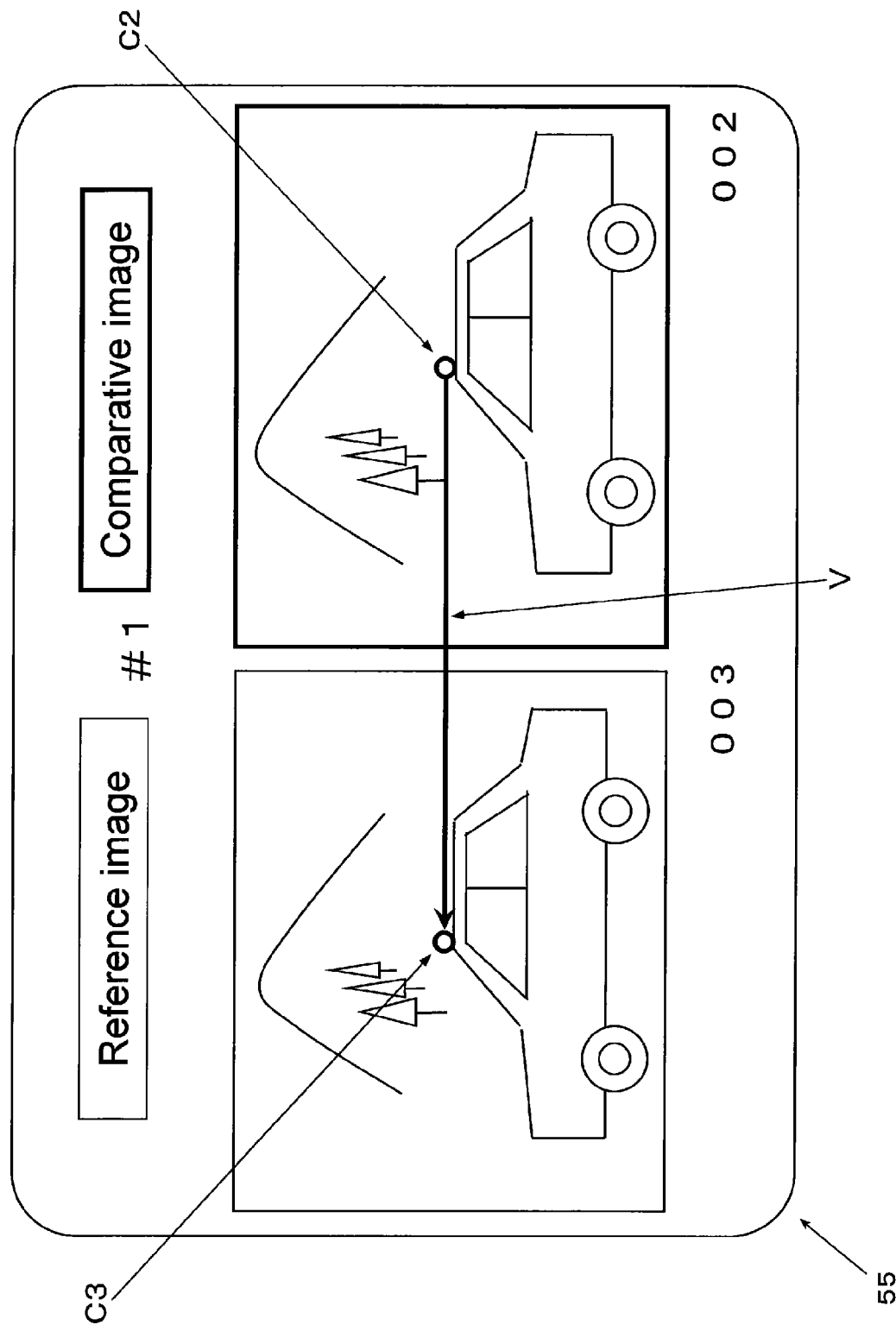
FIG. 23 is an example of the display of a reference image and a comparative image (sequentially captured image folder #1)

If comparative number K="002," then K<J, so as shown in FIG. 23, the comparative image 002 is displayed to the right of the reference image 003 on the liquid crystal monitor 55. In this case, the time vector V extending from the center C2 of the reference image to the center C3 of the comparative image substantially coincides with the direction of the panning Thus, with this digital camera 1, when a plurality of sequentially captured images are displayed, the layout of the images is automatically adjusted by the microprocessor 3 so that the direction of panning (the direction of movement of the subject) substantially coincides with the direction in which the images are laid out. Accordingly, a display state can be obtained that makes it easier for the user to check a plurality of sequentially captured images, and any unnaturalness of images laid out side by side can be reduced.

As shown in FIG. 15, when the image display operation is complete, the system goes into a mode of awaiting operation of the directional arrow key 38 or the set button 40 (S28). When the set button 40 is pressed, if at that point the reference image and the comparative image are displayed on the liquid crystal monitor 55, then the user uses the directional arrow key 38 and the set button 40 to select one of the images as the selected image (S29, S30). For instance, the display of the selected image can be enlarged or reduced by operating the zoom control lever 57. When just the reference image is displayed, then the reference image is automatically selected as the selected image.

If the directional arrow key 38 is operated without pressing the set button 40, the flow goes back to step S18, and the operation of steps S18 to S28 is repeated (S29).

When the Panning Horizontal Component is "To the Right" or "None"

Figure 16:
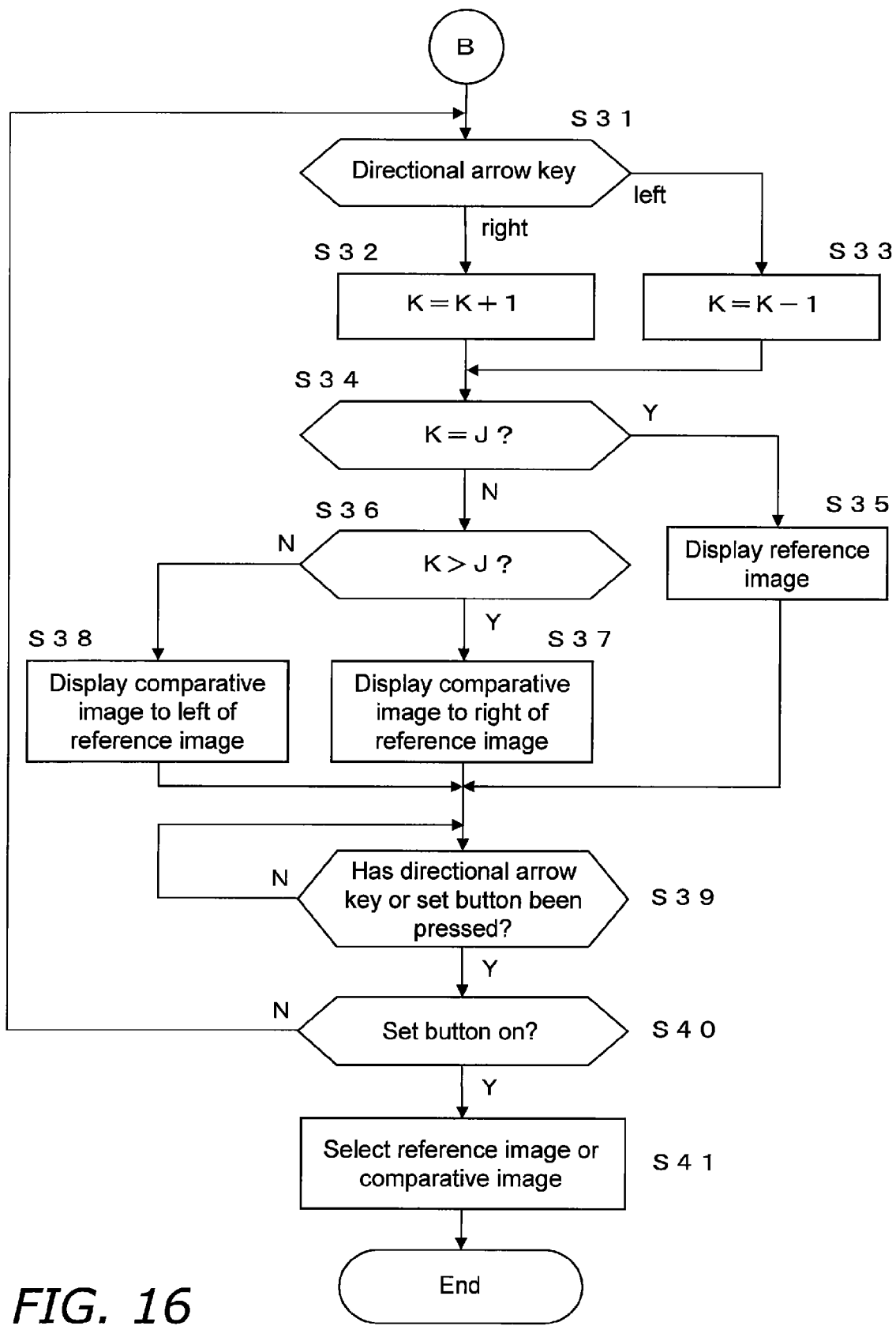
FIG. 16 is a flowchart of a reproduction method.

If the microprocessor 3 determines that the panning mode signal 60 in step S17 is neither "1," "4," nor "7," and the microprocessor 3 determines that the posture determination signal 61 in step S19 is "0," then image display is performed on the basis of the flow B shown in FIG. 16. More specifically, as shown in FIG. 16, the directional arrow key 38 is used to select a comparative image. For instance, when the directional arrow key 38 (or the dial disposed around the outside of the directional arrow key 38) is operated on the right side (turned to the right), the microprocessor 3 adds 1 to the comparative number K and sets a new comparative number K (S31, S32). On the other hand, if the directional arrow key 38 (or the dial) is operated on the left side (turned to the left), the microprocessor 3 subtracts 1 from the comparative number K and sets a new comparative number K (S31, S33).

Next, an image is displayed on the liquid crystal monitor 55 by the image display controller 13 on the basis of the reference number J and the comparative number K. More specifically, just as when the comparative number K is the same as the reference number J, only the reference image is displayed on the liquid crystal monitor 55 by the image display controller 13 (S34, S35).

Meanwhile, when the reference number J is different from the comparative number K, the reference number J and the comparative number K are compared to find which is larger (S36). If the comparative number K is greater than the reference number J, then the comparative image is an image acquired at a later time than the reference image. Meanwhile, in this flow B, this corresponds to a case when the horizontal component of the panning is "to the right" or "none." Therefore, the comparative image is displayed to the right of the reference image on the liquid crystal monitor 55 so that the posture of the time vector when the reference image and comparative image are laid out next to each other will be the same right direction as the horizontal component of the panning (S37). At this point the images displayed on the screen are horizontal because the photography posture was landscape posture.

If the comparative number K is less than the reference number J, then the comparative image is an image acquired at an earlier time than the reference image. Therefore, the comparative image is displayed to the left of the reference image on the liquid crystal monitor 55 so that the posture of the time vector when the reference image and comparative image are laid out next to each other will be the same right direction as the horizontal component of the panning (S38). At this point the images displayed on the screen are horizontal because the photography posture was landscape posture.

Figure 24:
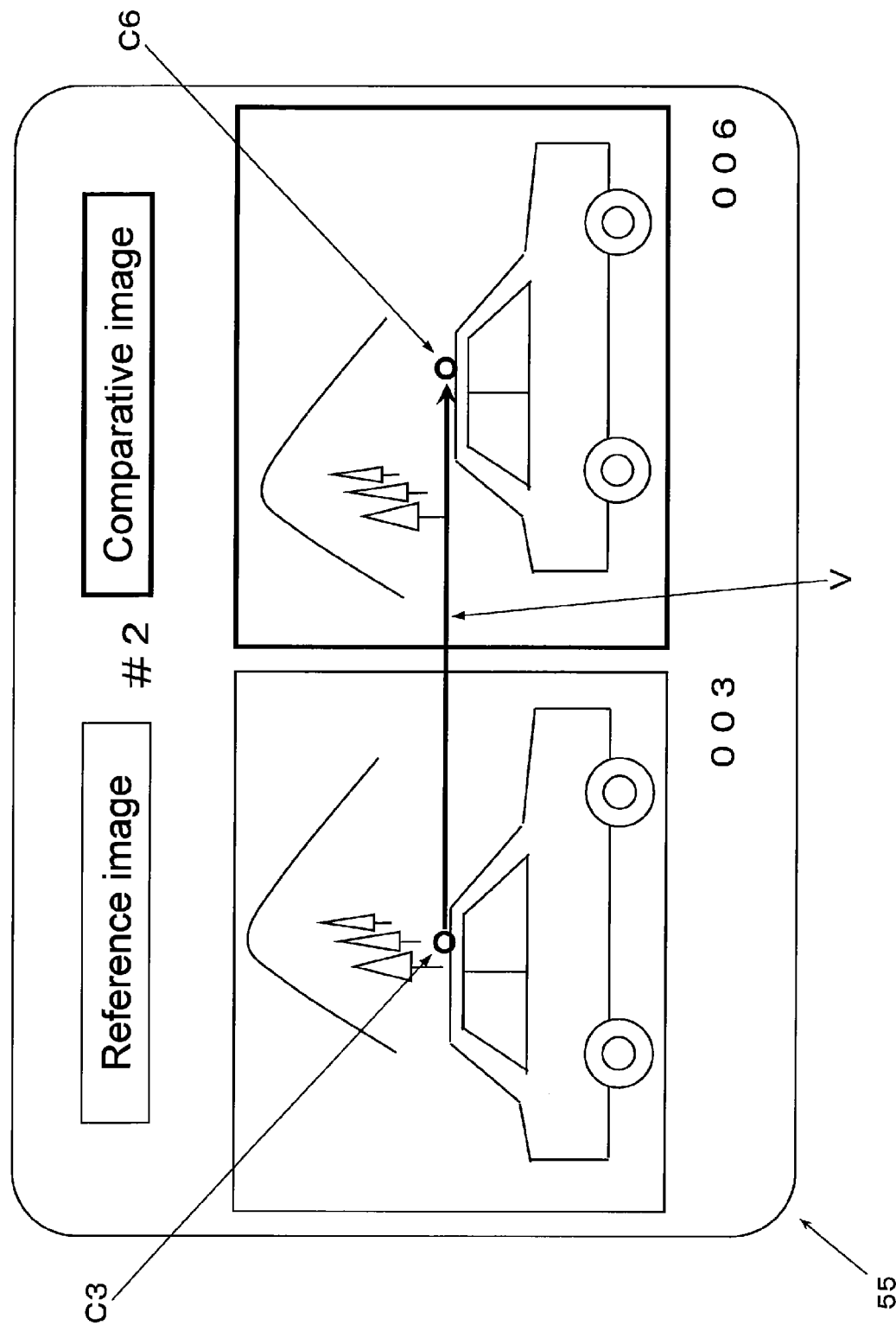
FIG. 24 is an example of the display of a reference image and a comparative image (sequentially captured image folder #2)

For example, when the sequentially captured image folder #2 has been selected, since the panning mode signal 60 is "1" as mentioned above, processing is carried out by this flow B. If we let reference number J="003" and comparative number K="006," then K>J. Accordingly, as shown in FIG. 24, the comparative image 006 is displayed to the right of the reference image 003 on the liquid crystal monitor 55.

Thus, with this digital camera 1, when a plurality of sequentially captured images are displayed, the layout of the images is automatically adjusted by the microprocessor 3 so that the direction of movement of the subject substantially coincides with the direction in which the images are laid out. Accordingly, a display state can be obtained that makes it easier for the user to check a plurality of sequentially captured images.

When the image display operation is complete, the system goes into a mode of awaiting operation of the directional arrow key 38 or the set button 40 (S39). When the set button 40 is pressed, if at that point the reference image and the comparative image are displayed on the liquid crystal monitor 55, then the user uses the directional arrow key 38 and the set button 40 to select one of the images as the selected image (S40, S41). For instance, the display of the selected image can be enlarged or reduced by operating the zoom control lever 57. When just the reference image is displayed, then the reference image is automatically selected as the selected image.

If the directional arrow key 38 is operated without pressing the set button 40, the flow goes back to step S31, and the operation of steps S31 to S39 is repeated (S40).

B) In Portrait Posture

When the Panning Horizontal Component is "To the Left"

Figure 17:
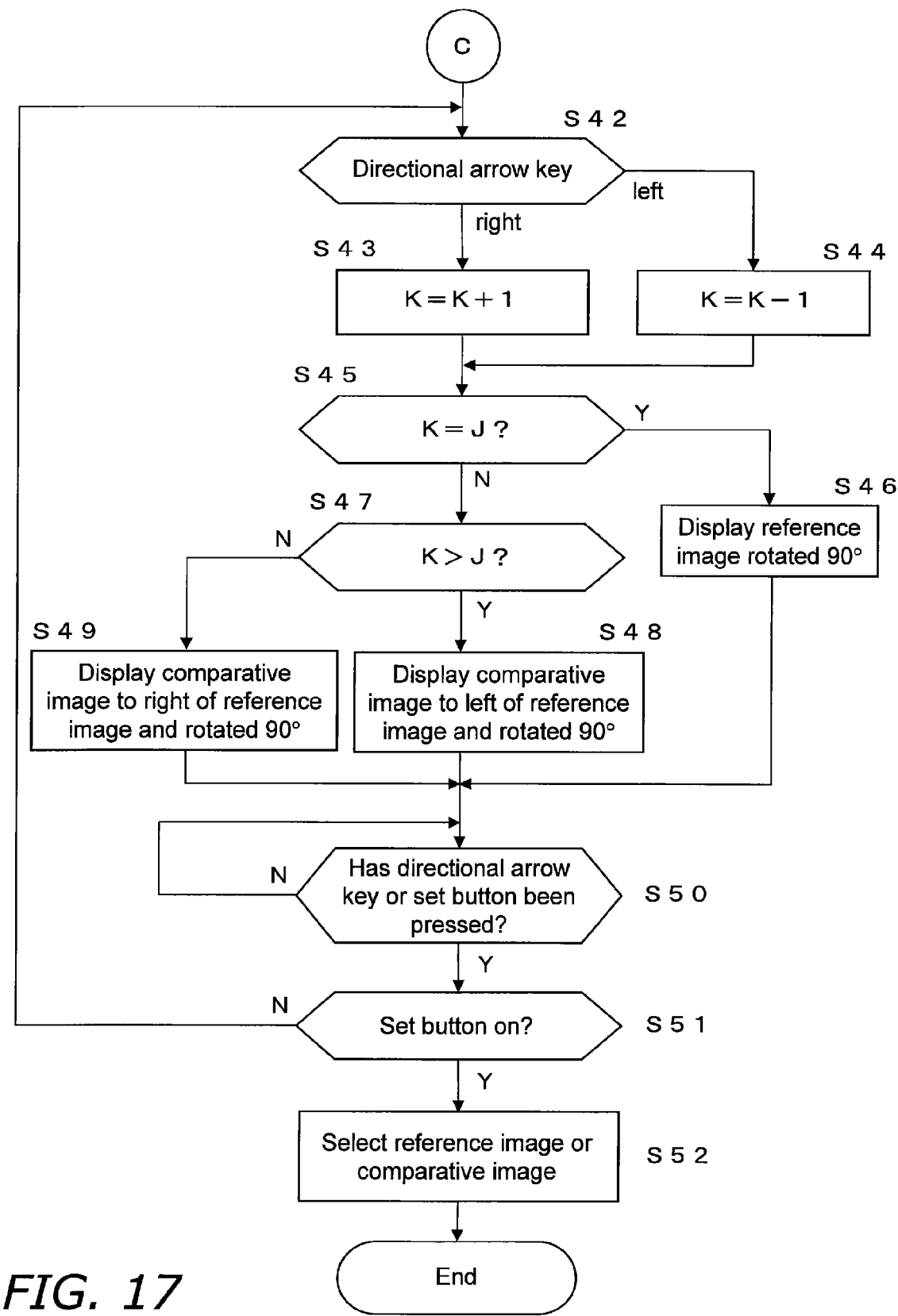
FIG. 17 is a flowchart of a reproduction method.

Flow C shown in FIG. 17 includes basically the same steps as flow A discussed above, but differs from flow A in that the images are displayed in a state of being rotated 90° in steps S46, S48, and S49. This is because it is determined in step S18 that the photography posture is portrait posture. The rest of the steps S42 to S45, S47, and S50 to S52 are the same as the corresponding steps of flow A above, and will not be described again in detail.

When the Panning Horizontal Component is "To the Right" or "None"

Figure 18:
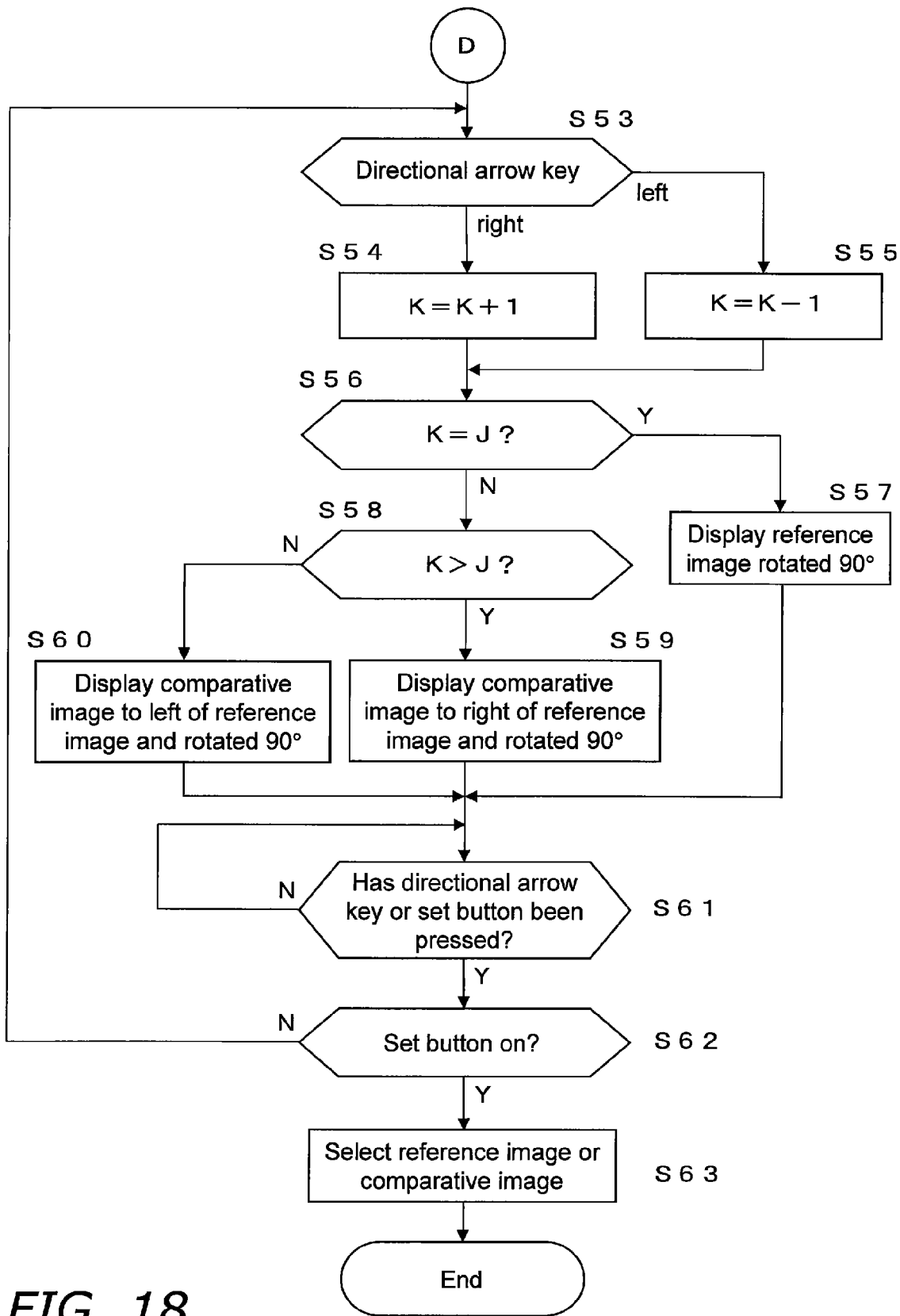
FIG. 18 is a flowchart of a reproduction method.
Figure 19:
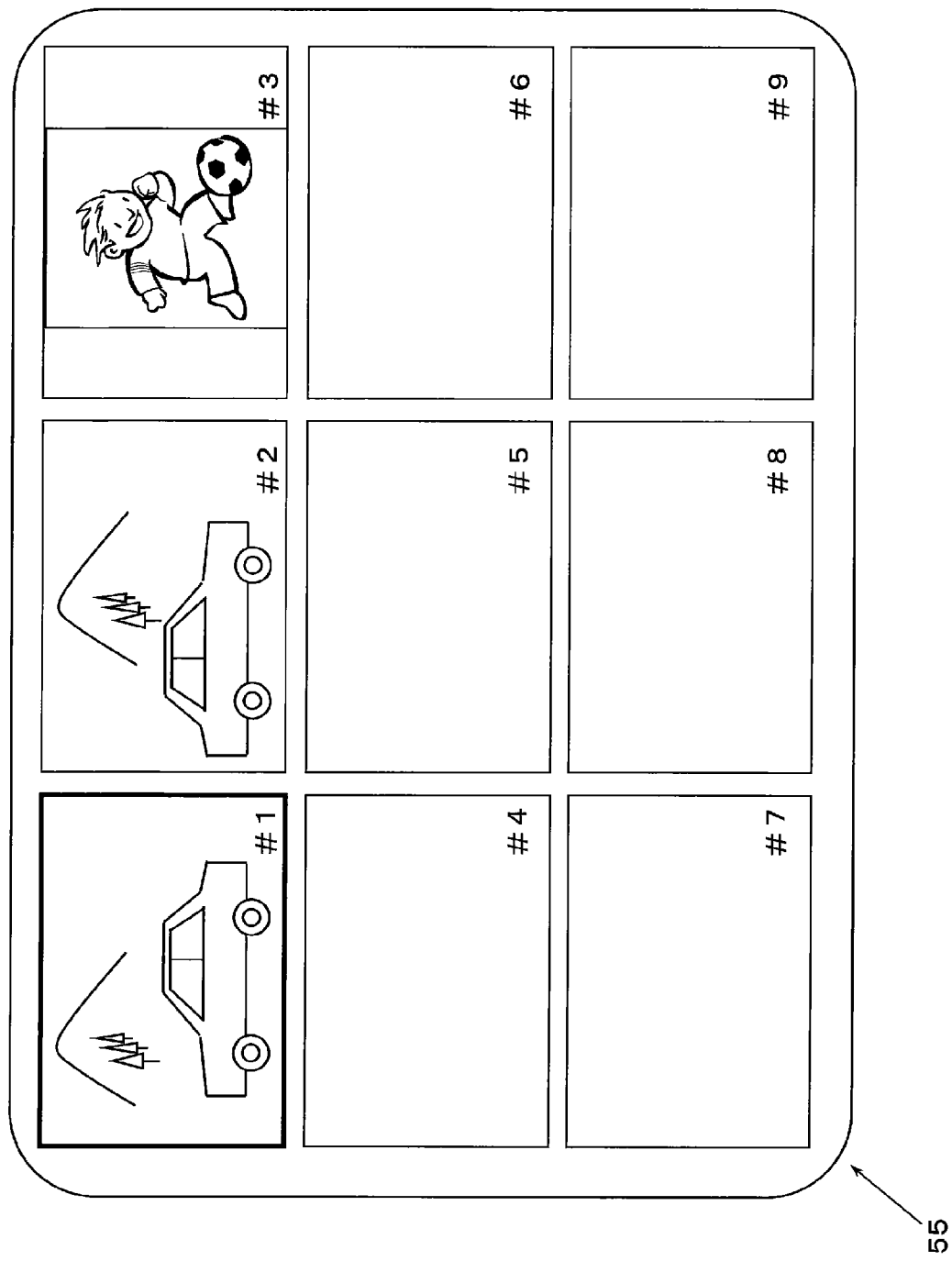
FIG. 19 is an example of thumbnail displays of sequentially captured image folders.
Figure 20:
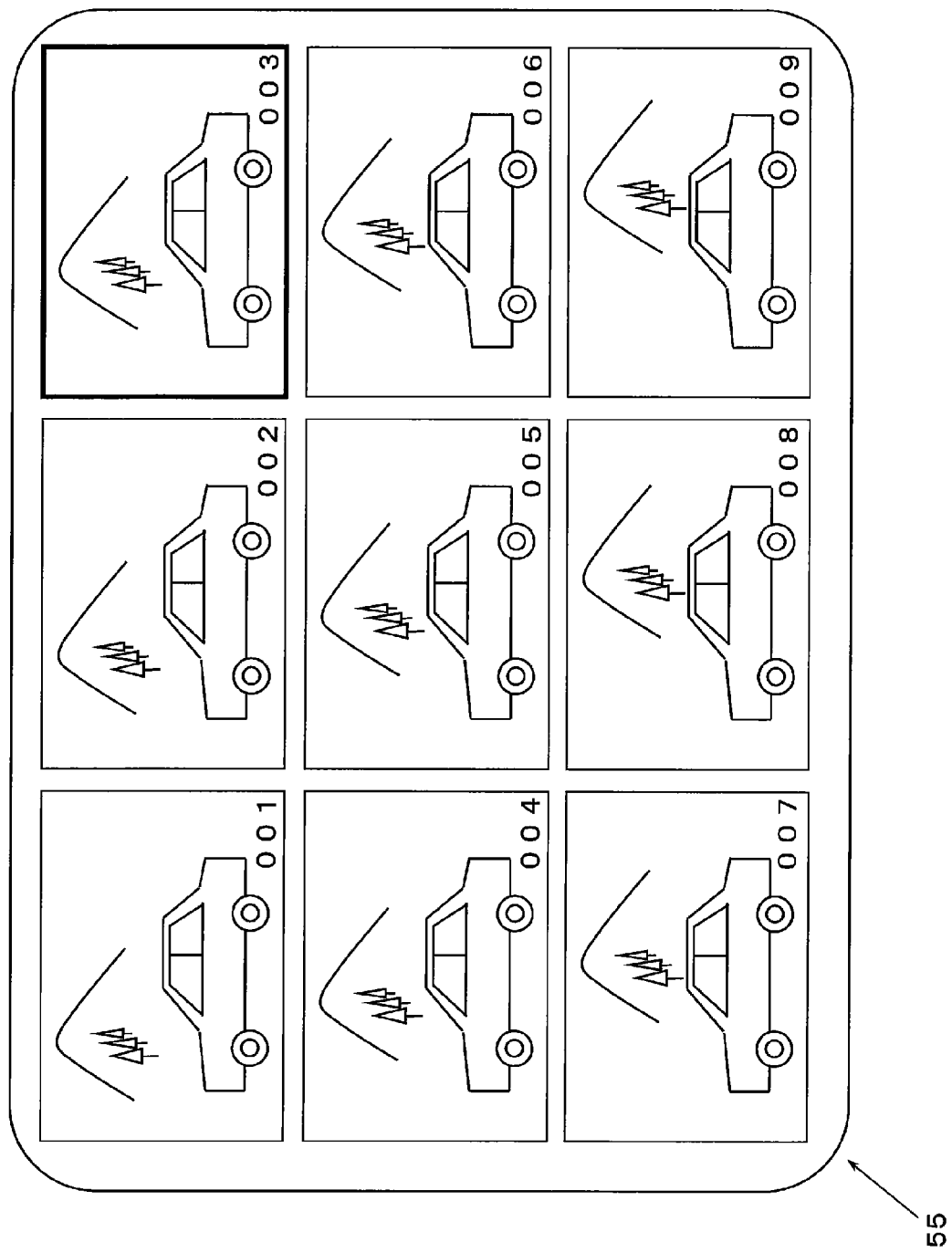
FIG. 20 is an example of thumbnail displays of sequentially captured images.

Flow D shown in FIG. 18 includes basically the same steps as flow B discussed above, but differs from flow B in that the images are displayed in a state of being rotated 90° in steps S57, S59, and S60. This is because it is determined in step S19 that the photography posture is portrait posture. The rest of the steps S53 to S56, S58, and S61 to S63 are the same as the corresponding steps of flow B above, and will not be described again in detail.

Figure 25:
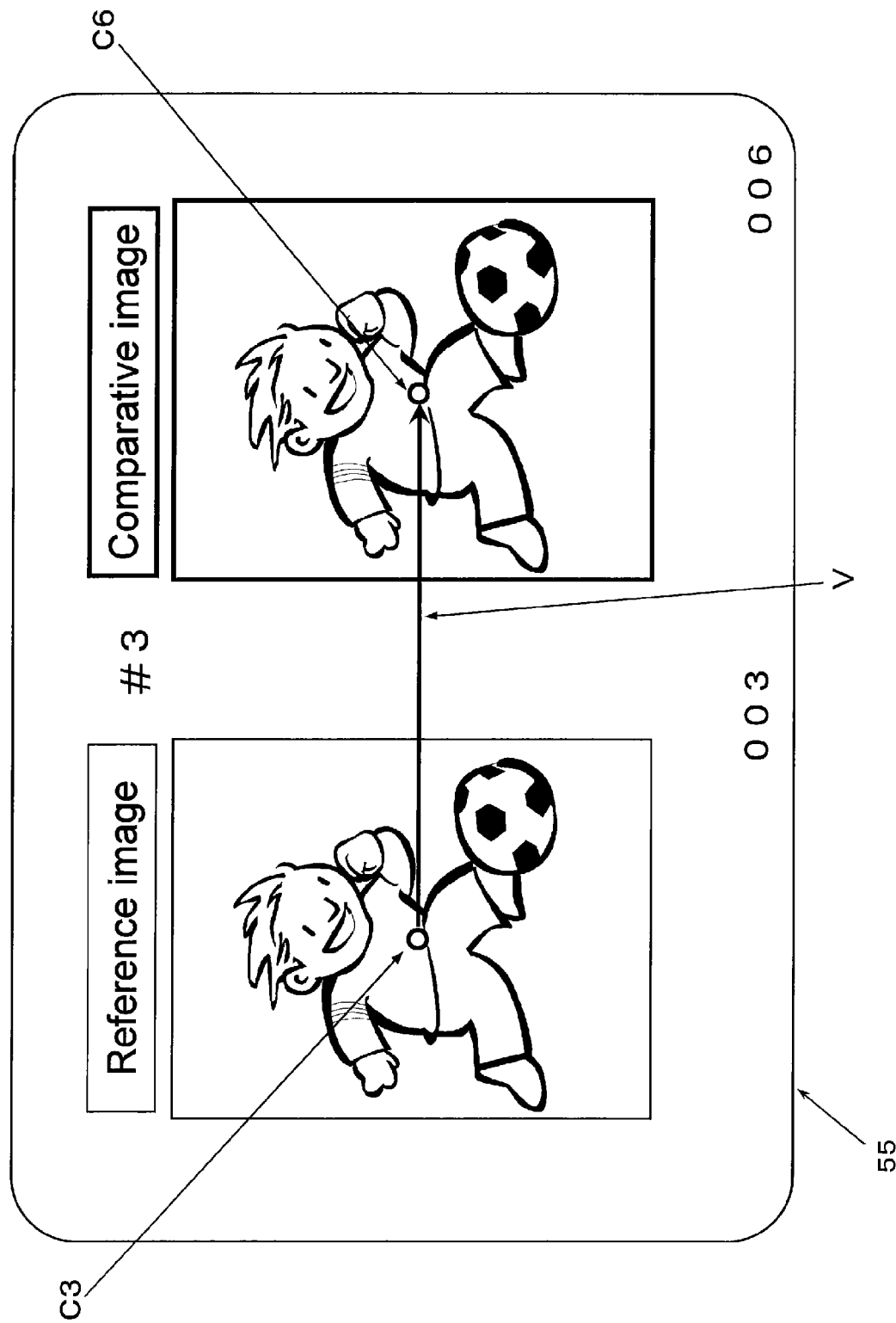
FIG. 25 is an example of the display of a reference image and a comparative image (sequentially captured image folder #2)

For example, when the sequentially captured image folder #3 has been selected, since the panning mode signal 60 is "1" as mentioned above, and the posture determination signal 61 is "1," processing is carried out by this flow D. If we let reference number J="003" and comparative number K="006," then K>J. Accordingly, as shown in FIG. 25, the comparative image 006 is displayed to the right of the reference image 003 on the liquid crystal monitor 55. At this point, since the photography posture was portrait posture, the images are displayed in a state of being rotated 90°.

Thus, with flows C and D, the images are displayed on the liquid crystal monitor 55 in a state of being restored to the posture during photography, which makes it easier for the user to check the images.

Features

The features of the digital camera 1 are as follows.

(1)

With this digital camera 1, the microprocessor 3 determines the layout of images on the basis of the panning mode signal 60, which serves as the first movement information. More specifically, the microprocessor 3 determines the layout of images so that the posture of the time vector formed by the images displayed side by side substantially coincides with the direction in which the digital camera 1 is moving, on the basis of the panning mode signal 60. As a result, the direction of movement of the digital camera 1 can be made to coincide substantially with the layout of the images, and any unnaturalness of the displayed images can be reduced.

(2)

With this digital camera 1, the vertical and horizontal components of panning are detected by the yaw angular velocity sensor 17$x$ and the pitch angular velocity sensor 17$y$. Furthermore, the panning mode signal 60 is automatically produced by the microprocessor 3 on the basis of these detection results, and the panning mode signal 60 is recorded to the image recorder 12 along with a plurality of sequentially captured images. As a result, the angular velocity sensors 17$x$ and 17$y$ used for image blur correction can be utilized as part of the detection component used for producing the panning mode signal 60.

(3)

With this digital camera 1, the state in which the images are displayed on the liquid crystal monitor 55 is adjusted by the microprocessor 3 and the image display controller 13 so that the height direction in the images when the images are displayed on the liquid crystal monitor 55 substantially coincides with the vertical direction. That is, the images are displayed on the liquid crystal monitor 55 in the same state as the state during photography. Accordingly, the height direction of the actual subject and the height direction of the subject in the images can be made to coincide substantially, which allows any unnaturalness of the displayed images to be reduced.

Second Embodiment

Figure 26:
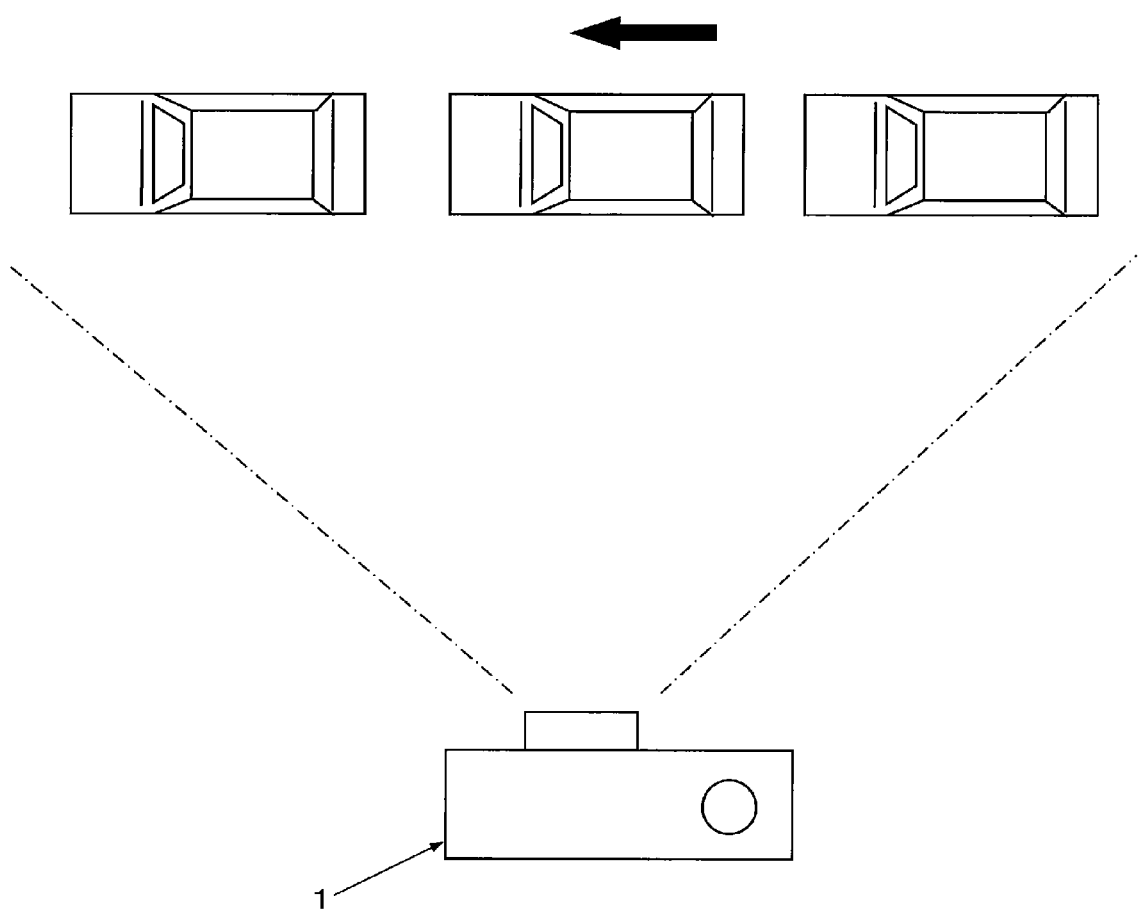
FIG. 26 is a diagram illustrating panning photography (second embodiment)
Figure 27:
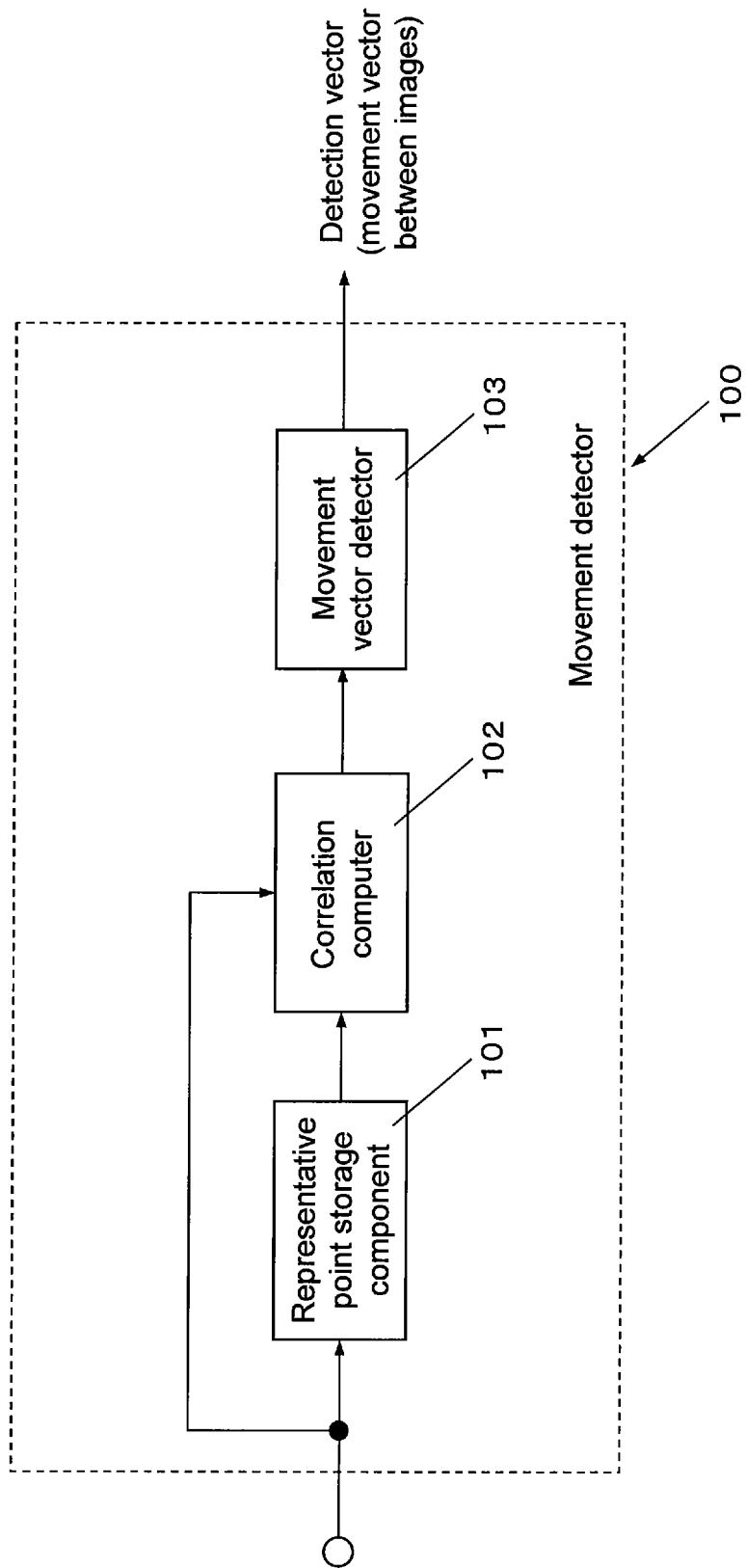
FIG. 27 is a diagram of the hardware configuration of an image blur correction mechanism (second embodiment)

In the embodiment given above, a case was described of panning the digital camera 1 to capture images sequentially. However, as shown in FIG. 26, it is also conceivable that sequential images of a moving subject are captured without panning the digital camera 1. FIG. 27 is a block diagram illustrating an example of the configuration of a movement detector. Those components that have substantially the same function as in the above embodiment are numbered the same, and will not be described again.

As shown in FIG. 26, the state of the photography posture of the digital camera 1 in the second embodiment indicates a situation in which images are sequentially captured over a wide angle of view, over an automobile moving to the left, with the photography view angle of the digital camera 1 in substantially the same state. Here, instead of the panning mode signal 60 used in the first embodiment, the layout of images is determined on the basis of the movement vector of the subject detected from the images. More specifically, just as with the panning mode signal 60 shown in FIG. 5, a movement vector signal 62 that indicates movement of the subject is produced by a movement detector 100 and the microprocessor 3.

More specifically, as shown in FIG. 27, the movement detector 100 is a unit for detecting movement of the subject within images on the basis of a plurality of images, and has a representative point storage component 101, a correlation computer 102, and a movement vector detector 103.

The representative point storage component 101 divides an image signal for the current frame inputted via the A/D converter 7 and the digital signal processor 8 into a plurality of regions, and stores the image signals corresponding to a specific representative point included in each region as representative point signals. The representative point storage component 101 reads the representative point signal one frame ahead of the current frame that has already been stored, and outputs it to the correlation computer 102.

The correlation computer 102 computes the correlation between the representative point signal one frame earlier and the representative point signal of the current frame, and compares the difference between the representative point signals. The computation result is outputted to the movement vector detector 103.

The movement vector detector 103 detects the movement vector of an image between one frame earlier and the current frame, in single pixel units, from the computation result supplied by the correlation computer 102. The movement vector is then outputted to the microprocessor 3. The microprocessor 3 adjusts the movement vector for gain, phase, etc., and calculates the direction and speed of movement per unit of time of the subject in the image signal. Depending on the direction in which the subject is moving, the movement vector signal 62 is produced as a signal from "0" to "8," as with the panning mode signal 60 shown in FIG. 5.

Just as in the first embodiment above, the layout of the images is determined by the microprocessor 3 on the basis of the movement vector signal 62. How this is determined is the same as in the embodiment above, and will therefore not be described again in detail.

The processing of detecting subject movement is commenced, for example, when the user presses the shutter button 36 half-way. Processing may begin after the user has turned off the power switch 35, or in conjunction with the operation of the capture/reproduce switching dial 37 to switch to photography mode.

With the above configuration of the digital camera 1, the layout of images is determined by the microprocessor 3 on the basis of the movement vector signal 62, serving as the second movement information. More specifically, the microprocessor 3 determines the layout of images so that the posture of the time vector formed by the images displayed side by side substantially coincides with the direction in which the subject is moving, on the basis of the movement vector signal 62. As a result, the direction of movement of the subject can be made to coincide substantially with the layout of the images, and any unnaturalness of the images displayed side by side can be reduced.

Third Embodiment

Figure 28:
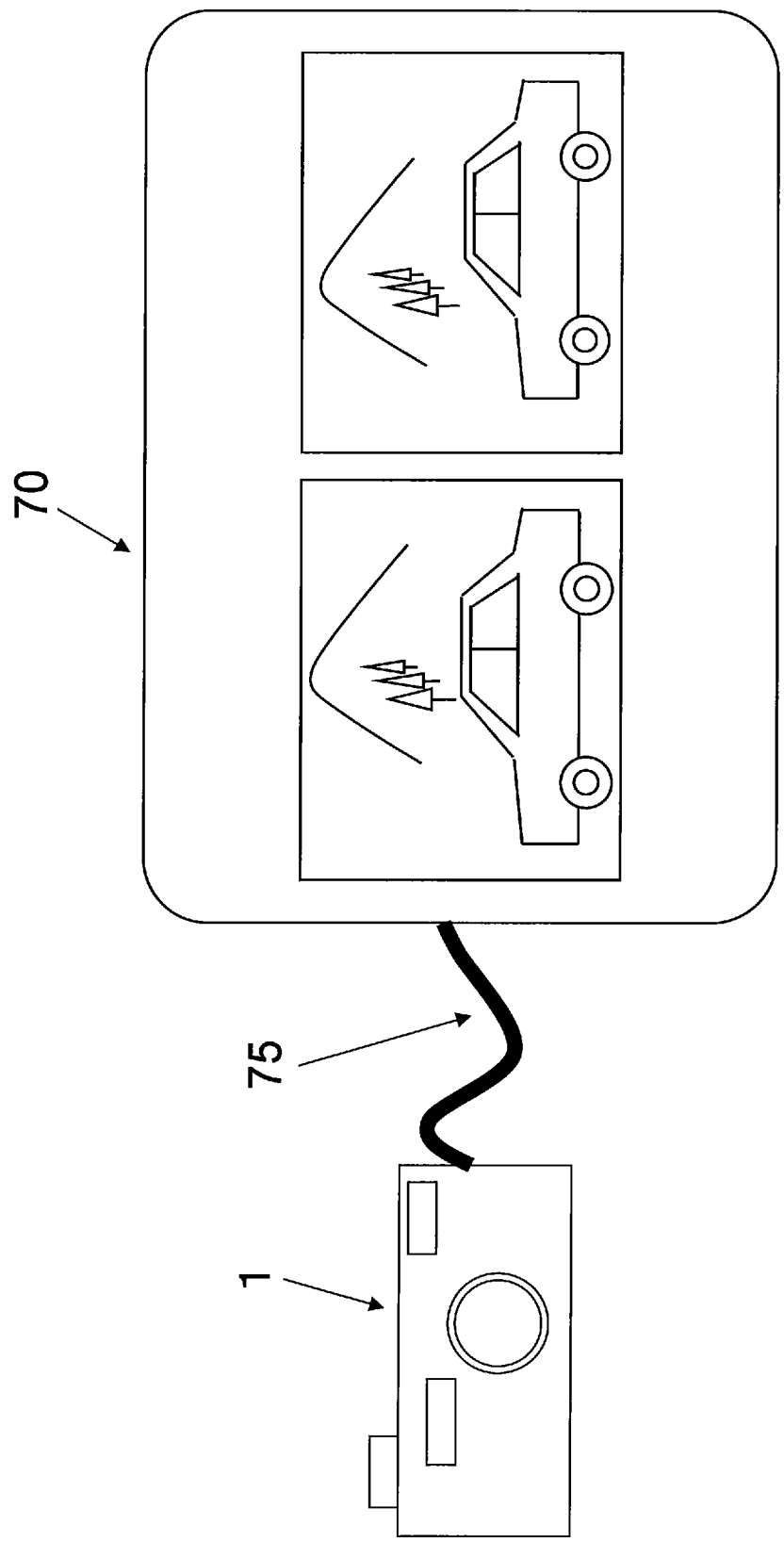
FIG. 28 is a diagram of a digital camera and a display device (third embodiment)

In the above embodiments, the images were displayed on the liquid crystal monitor 55, but as shown in FIG. 28, it is also conceivable that the images are displayed on a display device 70 connected to the digital camera 1.

In this case, the only difference is that the display component has been changed from the liquid crystal monitor 55 to the display device 70 (a television monitor or the like), and this embodiment is the same as those given above in that the microprocessor 3 determines the display state and layout of the images on the basis of the panning mode signal 60, the posture determination signal 61, the movement vector signal 62, or other such information. The display device 70 is connected to the digital camera 1 via a cable 75. The cable 75 is, for example, a USB (Universal Serial Bus) cable.

The above configuration is effect when no display component is provided to the digital camera, or when the images are to be displayed in a larger size. This makes possible a better display that is easier to view.

Furthermore, in the third embodiment, a television monitor was given as an example of the external display device 70, but the device is not limited to this. For example, it may be connected via the cable 75 to a personal computer connected to a monitor.

Furthermore, in the third embodiment, the use of a USB cable was given as an example of the cable 75, but other options are also possible. For instance, the connection can be made with an IEEE 1394 serial bus cable, or may be a wireless connection with a wireless LAN or the like.

Fourth Embodiment

In the third embodiment above, the display device 70 is connected to the digital camera 1, but it is also conceivable that a printing device 71 is connected to the digital camera 1, rather than the display device 70.

Figure 29:
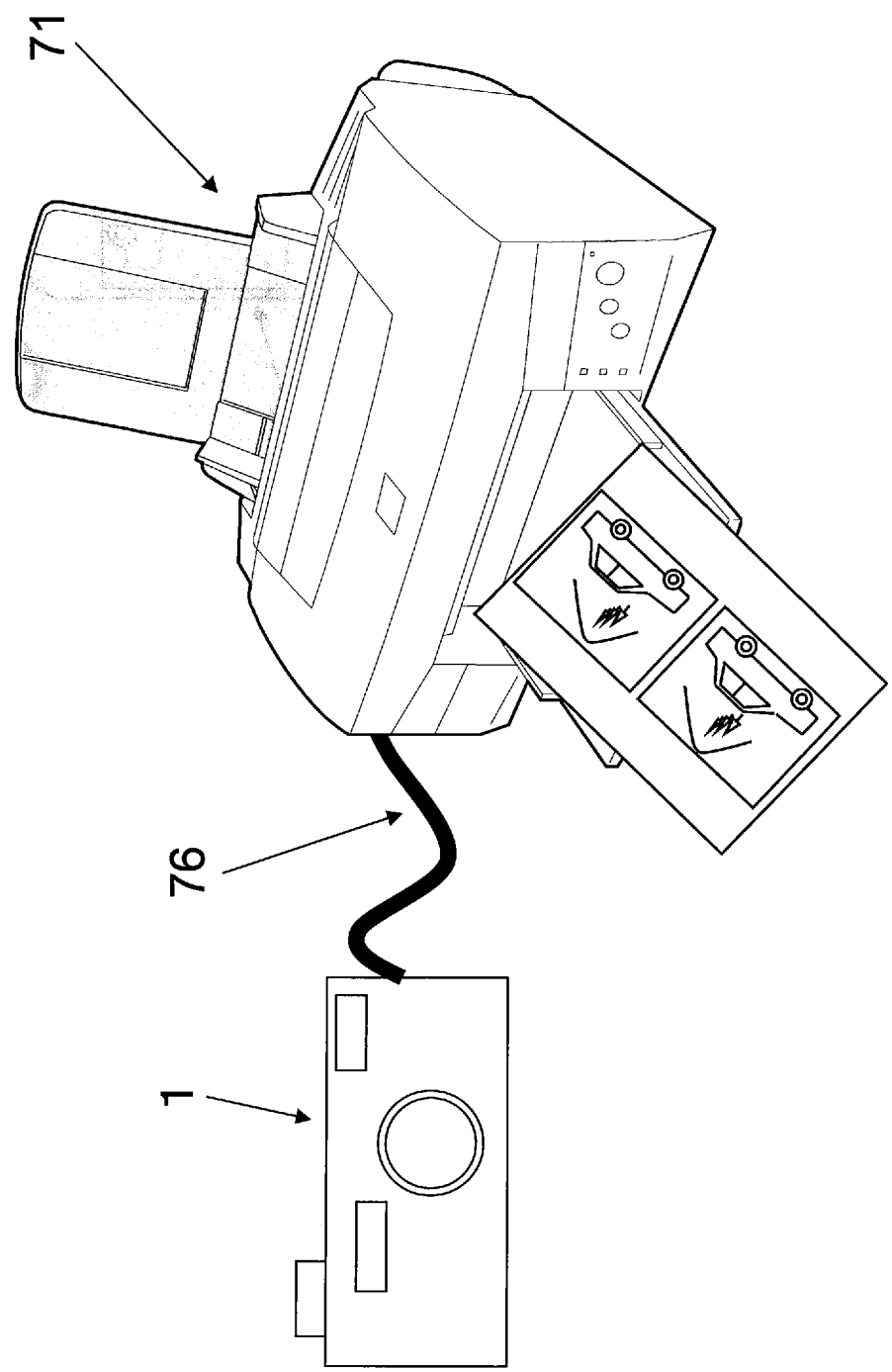
FIG. 29 is a diagram of a digital camera and a printing device (fourth embodiment)

In this case, as shown in FIG. 29, the only difference is that the display device 70 is replaced by the printing device 71, and this embodiment is the same as those given above in that the microprocessor 3 determines the display state and layout of the images on the basis of the panning mode signal 60, the posture determination signal 61, the movement vector signal 62, or other such information.

Here, the printing device 71 is connected to the digital camera 1 by a cable 76. The layout of the images is determined by the microprocessor 3 of the digital camera 1, and the images are displayed on the liquid crystal monitor 55. The images displayed on the liquid crystal monitor 55 are printed on paper by the printing device 71. This allows the direction of movement of the subject or the movement of the digital camera 1 to coincide substantially with the layout of the images, and reduces any unnaturalness in the printed images.

Furthermore, in this fourth embodiment, the external printing device 71 was given as an example of directly connecting a printer, but other options are also possible. For example, the configuration may be such that the connection is to a printer via a cable and a personal computer to which the digital camera 1 is connected.

Fifth Embodiment

Figure 30:
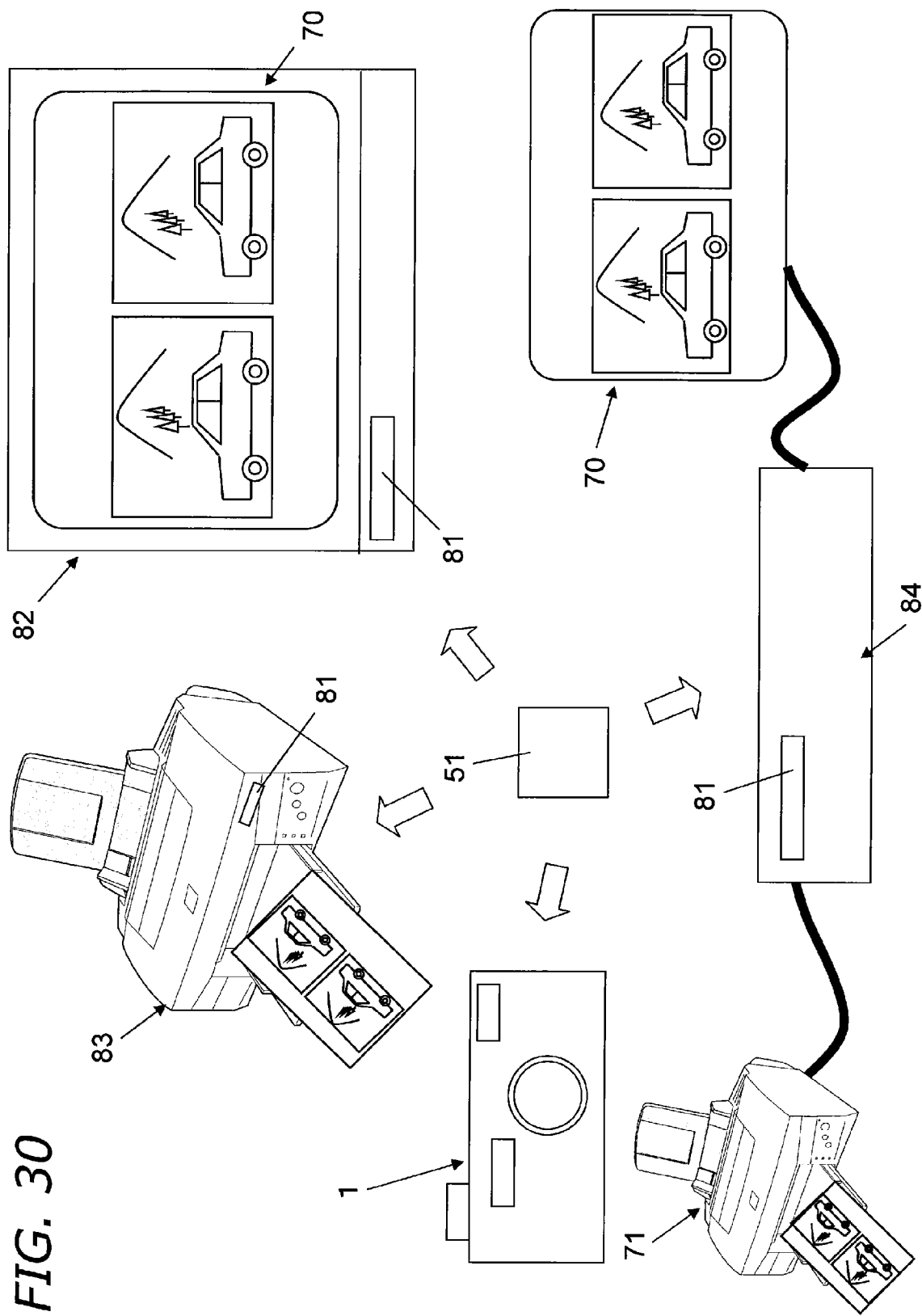
FIG. 30 is a diagram of a display control device, a printing control device, and a display and printing control device (fifth embodiment)

In this case, display control is performed by a display control device 82. More specifically, as shown in FIG. 30, the display control device 82 is a personal computer equipped with image processing software, for example. An image captured by the digital camera 1 is recorded to the removable memory 51 (such as a memory card) along with information such as thumbnail images, the posture determination signal 61, the panning mode signal 60, or the movement vector signal 62. The removable memory 51 is not limited to being a memory card, and may instead be a hard disk, an optical disk, or the like.

The display control device 82 has a removable memory insertion component 81 capable of reading information recorded to the removable memory 51, and the display device 70 on which images are displayed. Just as in the first embodiment above, the layout of the images displayed on the display device 70 is determined on the basis of the panning mode signal 60, the posture determination signal 61, the movement vector signal 62, etc., recorded to the removable memory 51.

As a result, with this display control device 82, the direction of movement of the subject or the movement of the digital camera 1 can be made to coincide substantially with the layout of the images, and this reduces any unnaturalness in the displayed images.

As shown in FIG. 30, the same effect can be obtained when printing is performed with a printing control device 84 equipped with the removable memory insertion component 81, or when display is performed by connecting the printing control device 84 to the display device 70, or when printing is performed by connecting to the printing device 71.

Also, examples of using a display device, printing device, and display and printing control device equipped with the removable memory insertion component 81 were given, but the present invention is not limited to these. For example, a reading device such as a memory card reader capable of reading the removable memory 51, a display and printing control device, a display device, and a printing device may be connected together.

Other Embodiments

The specific configuration of the present invention is not limited to the embodiments given above, and various changes and modifications are possible without departing from the gist of the invention.

(1)

With the above embodiments, the digital camera 1 was used to describe a display control device, but the device in which the display control device is installed is not limited to a digital camera, and as long as it is a device with which images captured with a digital camera can be displayed, the installation can be in some other device (such as a digital video camera, a mobile telephone terminal with a camera function, a PDA with a camera function, a DVD recorder, or a hard disk recorder).

(2)

With the above embodiments, the layout of the images was determined by dividing nine types of panning mode signal 60 ("0" to "8") substantially into two groups (to the left, and other). However, when the liquid crystal monitor 55 or other such display component is capable of display in a state in which a plurality of are laid out diagonally or above one another, the types may be further broken down into smaller groups. By breaking the panning mode signals 60 down into smaller groups, the panning direction or the direction in which the subject is moving can be substantially made to coincide with the time vector formed by the layout of the images, which reduces any unnaturalness in the displayed images.

(3)

In the first embodiment, angular velocity signals from the angular velocity sensors 17x and 17y were utilized to detect the panning mode, but signals from the yaw current value detector 14x and the pitch current value detector 14y may be utilized instead of the angular velocity sensors 17x and 17y.

Also, in the first embodiment, the photography posture was determined by detecting the current values of the pitch current value detector 14y and the yaw current value detector 14x, but it is also possible to find the photography posture by detecting the current value of just one or the other.

Also, if an abnormality occurs in either the pitch current value detector 14y or the yaw current value detector 14x, the photography posture can be accurately determined by detecting the current values of both detectors.

Furthermore, in the first embodiment, the photography posture was determined by detecting the current value of pitch and yaw current detectors, but the invention is not limited to this. For instance, the same effect can be obtained by measuring the voltage value.

(4)

In the first and second embodiments, the description was of an example of using an image blur correction mechanism for detecting the posture and the panning mode, but instead, for example, an angular velocity sensor, rotation detection device, or the like may be attached to the outside of the digital camera.

Also, in the above embodiments, a single shutter button was provided to the digital camera 1, but instead, for example, a shutter button for photography in landscape posture and a shutter button for photography in portrait posture may each be provided. In this case, the photography posture can be ascertained on the basis of signals from the two shutter buttons.

(5)

In the first and second embodiments, portrait posture was considered to be one in which the posture was rotated 90° to the right around the optical axis AX, using the case of landscape posture as a reference, but the same effect as above can be obtained when portrait posture is one in which the posture is rotated 90° to the left. In this case, the posture determination signal 61 for a posture rotated 90° to the left is "2," and a total of three kinds of posture can be detected: one kind of landscape posture and two kinds of portrait posture.

(6)

In the first and second embodiments, two kinds of signal, in which the posture determination signal 61 was "0" or "1," were added to the images, but instead, for example, a signal can be added for just one posture (such as portrait posture). Nor is the invention limited to recording the posture determination signal 61 to an image, and a method may be employed in which the posture determination signal 61 and the image are recorded to separate files, and the image is associated with the file to which the posture determination signal 61 is recorded. Similarly, the panning mode signal 60 and the movement vector signal 62 may also be recorded to files separate from the image file, and these files associated with the image.

(7)

Figure 31:
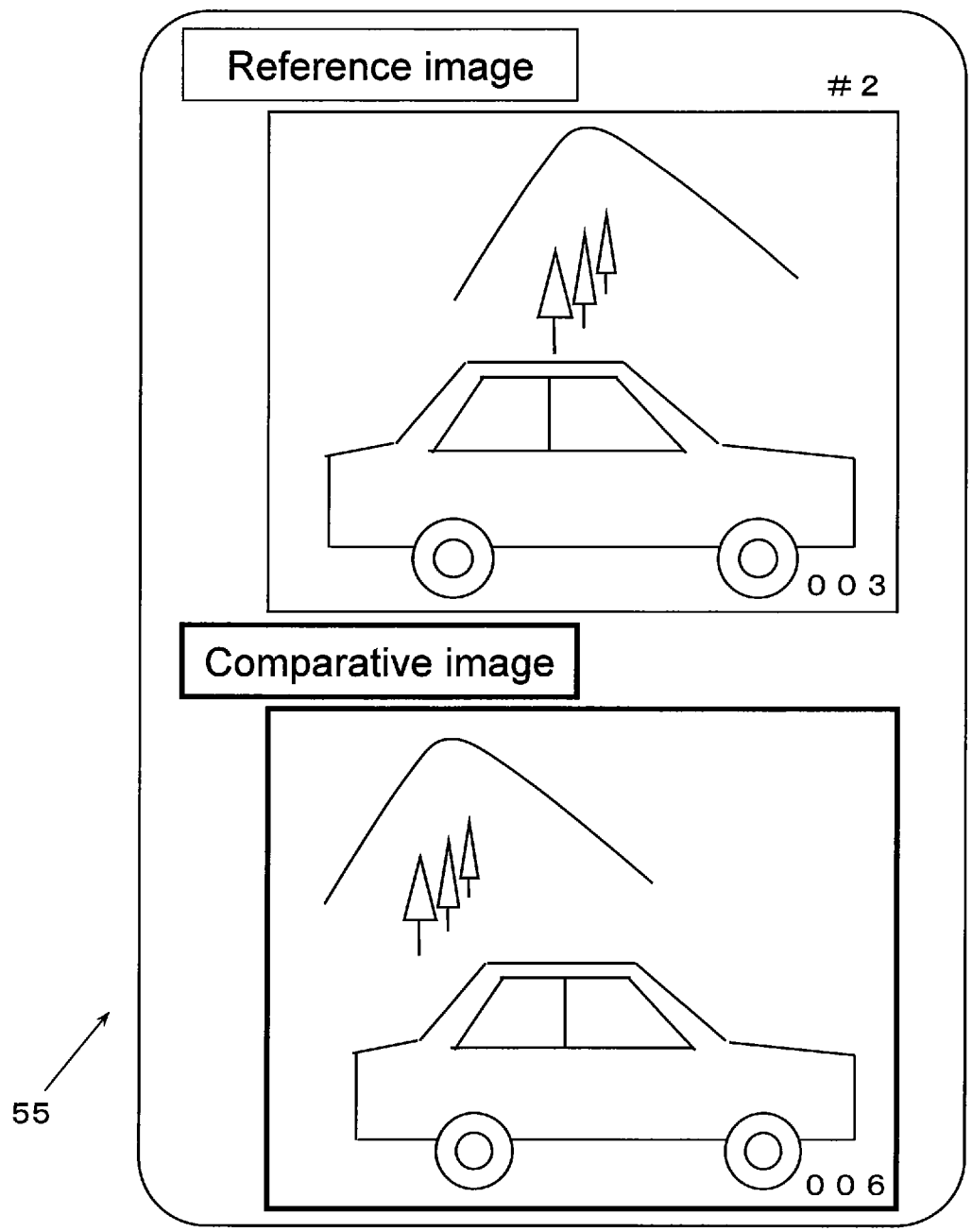
FIG. 31 is an example of the display of a reference image and a comparative image (other embodiment).

When the digital camera 1 is put in portrait posture while in reproduction mode, the images can be displayed larger than they are in FIG. 24 if the horizontal images are laid out vertically as shown in FIG. 31. Accordingly, the liquid crystal monitor 55 can be utilized more efficiently by detecting the posture during reproduction mode and layout out the images vertically when the digital camera 1 is in portrait posture.

(8)

The embodiments given above can also be combined. For example, the first embodiment and the second embodiment can be combined. More specifically, in the first embodiment, when the vertical and horizontal components of panning are both "none," that is, when the panning mode signal 60 is "0," the digital camera 1 is held so that it does not move. Therefore, it is also conceivable in this case that the movement vector signal 62 is produced from the image, and the layout of the images is determined on the basis of the movement vector signal 62 as in the second embodiment. If the panning mode signal 60 is other than "0," it is conceivable that the panning mode signal 60 will be given priority.

General Interpretation of Terms

In understanding the scope of the present invention, the term "configured" as used herein to describe a component, section, or part of a device includes hardware and/or software that is constructed and/or programmed to carry out the desired function.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including," "having," and their derivatives. Also, the terms "part," "section," "portion," "member," or "element" when used in the singular can have the dual meaning of a single part or a plurality of parts.

Terms that are expressed as "means-plus function" in the claims should include any structure that can be utilized to carry out the function of that part of the present invention. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A display control device for controlling a display component to display a plurality of images side by side, comprising:
   a recorder configured to record the plurality of images;
   a layout determiner configured to determine a layout of the plurality of images including a layout of one reference image and at least one comparative image arranged simultaneously side by side with the reference image, the layout determiner determining the layout of the plurality of images by replacing the at least one comparative image with another image selected from the plurality of images while the reference image remains the same, the at least one comparative image and the reference image displayed simultaneously side by side on a screen being different from each other; and
   an image display controller configured to control the display component to display the reference image and the comparative image simultaneously side by side on the screen according to the layout of the plurality of images determined by the layout determiner.

2. The display control device according to claim 1, wherein an order of the time of the capture of the plurality of images is determined based on movement information that relates to movement of the imaging device.

3. The display control device according to claim 1, wherein an order of the time of the capture of the plurality of images is determined based on movement information that relates to movement of the subject.

4. A printing device, comprising:
   the display control device according to claim 1; and
   a printing component configured to print the plurality of images displayed on the display component.

5. The display control device according to claim 1, wherein the layout determiner determines or changes:
   the layout of the plurality of images so as to include a reference image, a first comparative image arranged on one side of the reference image, and a second comparative image arranged on the other side of the reference image; and
   the layout of the plurality of images such that even when the first comparative image or the second comparative image has been replaced with another image selected from the plurality of images, the first comparative image is always different from either the reference image or the second comparative image according to specific information including an order of the time of the capture of the plurality of images, and the second comparative image is always different from the first comparative image according to the order of the time of the capture of the plurality of images.

6. The display control device according to claim 1, wherein the recorder is configured to record the plurality of images together with specific information including an order of the time of the capture of the plurality of images; and
   the layout determiner is configured to determine and change the layout of the plurality of images according to the order of the time of the capture of the plurality of images recorded to the recorder.

7. An imaging device, comprising:
   a display control device for controlling a display component to display a plurality of images side by side, comprising:
      a recorder configured to record the plurality of images and specific information including an order of the time of the capture of the plurality of images;
      a layout determiner configured to determine and change a layout of the plurality of images according to the order of the time of the capture of the plurality of images recorded to the recorder, the layout of the plurality of images including a layout of one reference image and at least one comparative image arranged side by side with the reference image; and
      an image display controller configured to control the display component to display the reference image and the comparative image side by side according to the layout of the plurality of images determined by the layout determiner, wherein
      the layout determiner determines the layout of the plurality of images such that even when the at least one comparative image arranged side by side with the reference image has been replaced with another image selected from the plurality of images, the at least one comparative image is always different from the reference image according to the order of the time of the capture of the plurality of images, and wherein the order of the time of the capture of the plurality of images is determined based on movement information that relates to movement of the imaging device;
   an imaging optical system arranged to form an optical image of a subject;
   an imaging component configured to convert the optical image formed by the imaging optical system into an electrical image signal, and acquiring an image of the subject;
   a display component configured to display a plurality of images acquired by the imaging component side by side; and
   a movement detector configured to acquire the movement information that relates to the movement of the imaging device.

8. An imaging device, comprising:
   a display control device for controlling a display component to display a plurality of images side by side, comprising:
      a recorder configured to record the plurality of images and specific information including an order of the time of the capture of the plurality of images;

a layout determiner configured to determine and change a layout of the plurality of images according to the order of the time of the capture of the plurality of images recorded to the recorder, the layout of the plurality of images including a layout of one reference image and at least one comparative image arranged side by side with the reference image; and an image display controller configured to control the display component to display the reference image and the comparative image side by side according to the layout of the plurality of images determined by the layout determiner, wherein the layout determiner determines the layout of the plurality of images such that even when the at least one comparative image arranged side by side with the reference image has been replaced with another image selected from the plurality of images, the at least one comparative image is always different from the reference image according to the order of the time of the capture of the plurality of images, and wherein the order of the time of the capture of the plurality of images is determined based on movement information that relates to movement of the subject;

an imaging optical system arranged to form an optical image of a subject;

an imaging component configured to convert the optical image formed by the imaging optical system into an electrical image signal, and acquiring an image of the subject;

a display component configured to display a plurality of images acquired by the imaging component side by side; and a movement detector configured to acquire the movement information that relates to movement of the subject.

9. A display control device for controlling a display component to display a plurality of images side by side, comprising:

a recorder configured to record the plurality of images;

a layout determiner configured to determine a layout of the plurality of images, by selecting, from among the plurality of images, one reference image and at least one comparative image arranged side by side simultaneously with the reference image so as to be included in the layout; and an image display controller configured to control the display component to display the reference image and the comparative image simultaneously side by side on a screen according to the layout of the plurality of images determined by the layout determiner each time the layout determiner has determined or changed the layout of the plurality of images, wherein when the layout determiner has selected the one reference image included in the layout, the layout determiner is prevented from selecting, for the at least one comparative image, the same image as the one reference image from among the plurality of images, and the image display controller controls the display component to display only the at least one comparative image that is different from the reference image simultaneously side by side on the screen with the reference image.

10. The display control device according to claim 9, wherein the layout determiner determines or changes the layout of the plurality of images so as to include the one reference image, a first comparative image arranged on one side of the reference image, and a second comparative image arranged on the other side of the reference image; and when the layout determiner has selected the one reference image included in the layout, the layout determiner is prevented from selecting, for either the first or the second comparative image, the same image as the one reference image from among the plurality of images and is further prevented from selecting, for the second comparative image, the same image as the first comparative image from among the plurality of images, and the image display controller controls the display component to display the reference image, the first comparative image and the second comparative image that are different from each other according to an order of the time of the capture of the plurality of images.

11. A display control method, comprising the steps of:

recording a plurality of images;

determining a layout of the plurality of images including a layout of one reference image and at least one comparative image arranged simultaneously side by side with the reference image, wherein the reference image and the at least one comparative image are different from each other;

displaying the reference image and the at least one comparative image simultaneously side by side on a screen according to the determined layout;

replacing the at least one comparative image with another comparative image selected from the plurality of images while the reference image remains the same, wherein the another comparative image and the reference image are different from each other;

determining another layout of the reference image and the another comparative image arranged simultaneously side by side with the reference image;

displaying the reference image and the another comparative image simultaneously side by side on the screen according to the determined another layout.

12. The display control method of claim 11, wherein the plurality of images are recorded together with specific information including an order of the time of the capture of the plurality of images; and layouts of the plurality of images are determined and changed according to the recorded order of the time of the capture of the plurality of images.

* * * * *